United States Patent
Okamura

(10) Patent No.: US 6,618,400 B1
(45) Date of Patent: Sep. 9, 2003

(54) SYSTEM FOR EFFECTIVELY USING ISDN BACKUP CHANNEL

(75) Inventor: Mineo Okamura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/221,408

(22) Filed: Dec. 28, 1998

(30) Foreign Application Priority Data

Jul. 10, 1998 (JP) .......................................... 10-196383

(51) Int. Cl.[7] .............................. H04J 3/12; H04L 12/28; G01R 31/08
(52) U.S. Cl. .................... 370/524; 370/227; 370/395.21
(58) Field of Search ................................. 370/524, 522, 370/501, 492, 491, 500, 395, 232, 225, 226, 216, 236, 229, 227, 228, 235, 237

(56) References Cited

U.S. PATENT DOCUMENTS

| | | | | |
|---|---|---|---|---|
| 5,193,086 A | * | 3/1993 | Satomi et al. | 370/228 |
| 5,210,740 A | * | 5/1993 | Anzai et al. | 370/228 |
| 5,406,564 A | * | 4/1995 | Okita | 370/228 |
| 5,515,429 A | * | 5/1996 | Kawada et al. | 370/216 |
| 5,689,513 A | * | 11/1997 | Okita et al. | 370/228 |
| 5,692,126 A | * | 11/1997 | Templeton et al. | 370/401 |
| 5,712,847 A | * | 1/1998 | Hata | 370/228 |
| 5,715,237 A | * | 2/1998 | Akiyoshi | 370/228 |
| 5,737,312 A | * | 4/1998 | Sasagawa | 370/232 |
| 5,912,877 A | * | 6/1999 | Shirai et al. | 370/228 |
| 6,028,858 A | * | 2/2000 | Rivers et al. | 370/352 |
| 6,031,906 A | * | 2/2000 | Rao | 370/228 |
| 6,038,219 A | * | 3/2000 | Mawhinney et al. | 370/242 |
| 6,118,759 A | * | 9/2000 | Ohyoshi et al. | 370/229 |
| 6,269,149 B1 | * | 7/2001 | Hassell et al. | 379/1 |

FOREIGN PATENT DOCUMENTS

| | | |
|---|---|---|
| JP | 4-77155 | 3/1992 |
| JP | 4-157845 | 5/1992 |
| JP | 4-307853 | 10/1992 |
| JP | 5-316139 | 11/1993 |

* cited by examiner

Primary Examiner—Kwang Bin Yao
Assistant Examiner—Hanh Nguyen
(74) Attorney, Agent, or Firm—Katten Muchin Zavis Rosenman

(57) ABSTRACT

A node of #B selects an ISDN line for backup in which a bulk transfer by a plurality of B channels is performed, out of a plurality of ISDN lines which can be set by a node of #A, by way of the pilot selection function on the ISDN switching network side. At this time, two nodes of #A and #B exchange both the child number of an ISDN line to be selected and the number of B channels to be transferred in bulk as user-user information in the D channel message of the ISDN line with each other, and select an ISDN line based on the information.

14 Claims, 36 Drawing Sheets

| REPEATER LINE ID |
|---|
| CONNECTION NODE ID |
| ISDN CONNECTION DESTINATION NUMBER (PILOT NUMBER) |
| NUMBER OF BYPASS CHANNELS |
| : : |
| REPEATER LINE ID |
| : : |

REPEATER LINE BYPASS DESTINATION MANAGEMENT TABLE

FIG. 6A

| ISDN LINE ID |
|---|
| CHILD NUMBER |
| ISDN LINE ID |
| : : |

ISDN LINE CHILD NUMBER MANAGEMENT TABLE

FIG. 6B

| ISDN LINE ID |
|---|
| B1 CHANNEL STATUS INDICATION (UNUSED/ RESERVED/USED) |
| B1 CHANNEL USE CONNECTION DESTINATION NUMBER |
| B2 CHANNEL STATUS INDICATION (UNUSED/ RESERVED/USED) |
| B2 CHANNEL USE CONNECTION DESTINATION NUMBER |
| : : |
| ISDN LINE ID |
| : : |

ISDN LINE CHANNEL MANAGEMENT TABLE

FIG. 6C

| CONNECTION NODE ID |
|---|
| BYPASS LINE BAND |
| BYPASS LINE BAND RESTRICTION RATIO |
| BYPASS LINE BAND RESTRICTION VALUE |
| BYPASS LINE BAND OCCUPANCY VALUE |
| : : |
| CONNECTION NODE ID |
| : : |

BYPASS LINE BAND MANAGEMENT TABLE

FIG. 6D

| TERMINAL ADDRESS |
|---|
| BYPASS AVAILABLE/ UNAVAILABLE |
| : : |
| TERMINAL ADDRESS |
| : : |

TERMINAL BYPASS MANAGEMENT TABLE

FIG. 6E

| CONNECTION NODE ID |
|---|
| BYPASS LINE INCONNECTION/ OUT-OF-CONNECTION |
| BYPASS LINE UNDER-RESTRICTION/ UNDER-NON-RESTRICTION |
| : : |
| CONNECTION NODE ID |
| : : |

CONNECTION DESTINATION BYPASS REGULATION TABLE

FIG. 6F

ENTIRE FORMAT

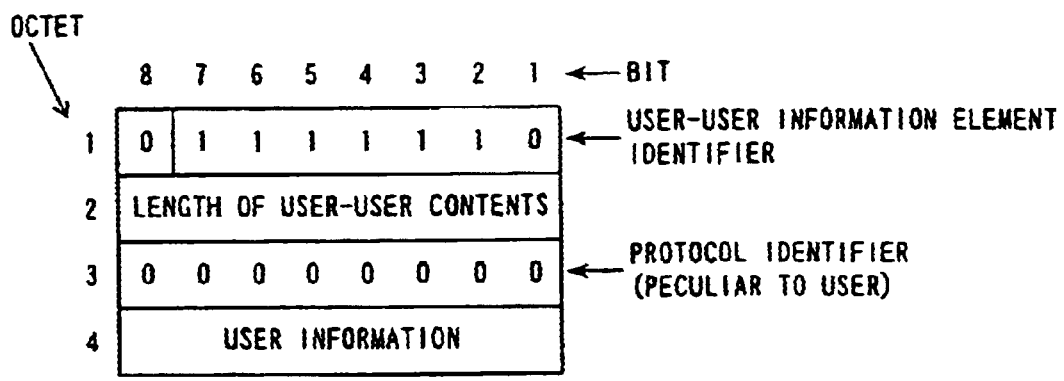

FIG. 7A

CONTENTS OF USER INFORMATION

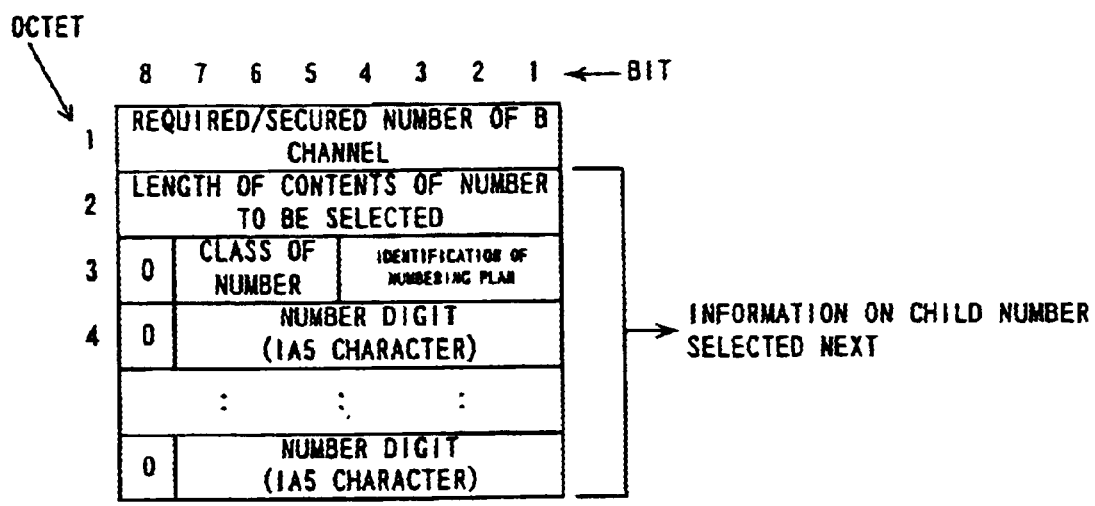

- CLASS OF NUMBER
  - 000: NOT USED
  - 001: OVERSEAS NUMBER
  - 010: DOMESTIC NUMBER
  - 011: NETWORK PROPER NUMBER
  - 100: LOCAL NUMBER
  - 110: ABBREVIATED NUMBER
  - 111: RESERVED FOR EXTENSION

- IDENTIFICATION OF NUMBERING PLAN
  - 0000: NOT USED
  - 0001: ISDN/TELEPHONE NUMBERING PLAN
  - 0011: DATA NUMBERING PLAN
  - 0100: TELEX NUMBERING PLAN
  - 1000: DOMESTIC NUMBERING PLAN
  - 1001: PRIVATE NETWORK NUMBERING PLAN
  - 1111: RESERVED FOR EXTENSION
  - OTHER THAN ABOVE: RESERVED

FIG. 7B

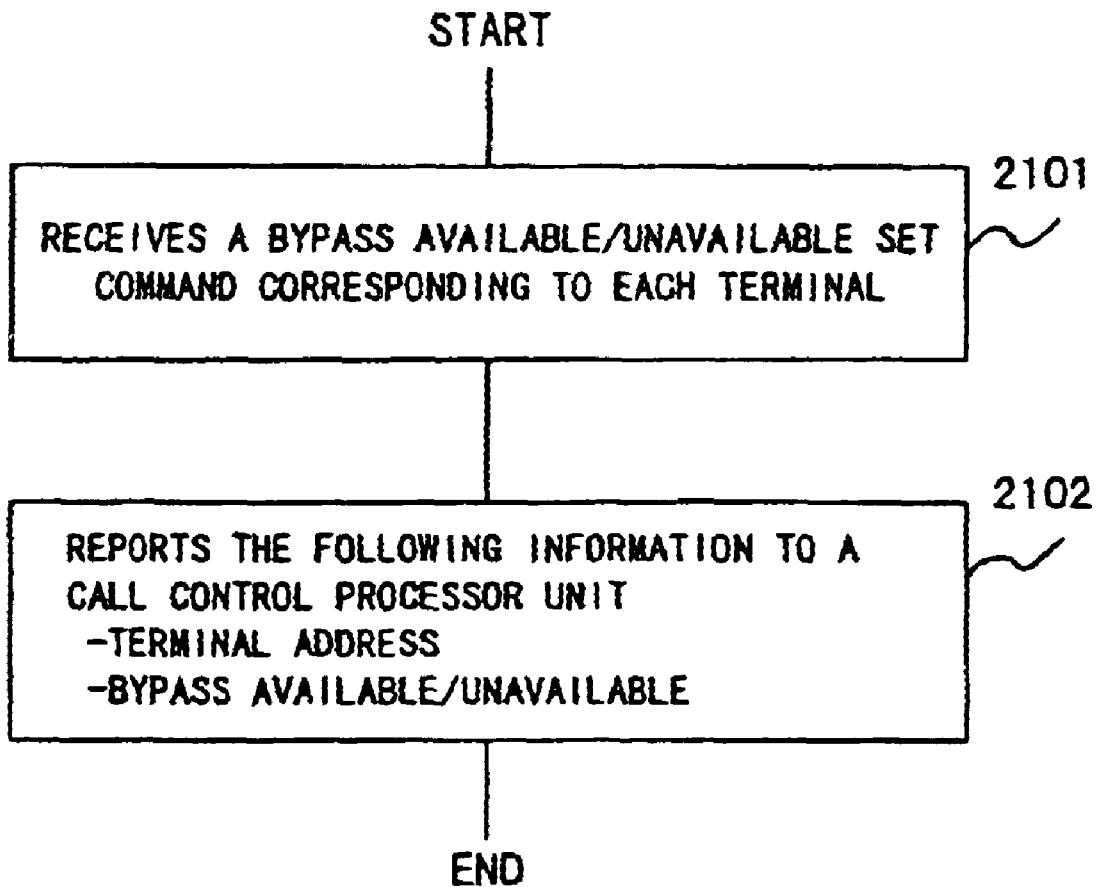
F I G. 23

SYSTEM FOR EFFECTIVELY USING ISDN BACKUP CHANNEL

BACKGROUND OF THE INVENTION

1. Field of the Invention

The present invention relates to a repeater line backup technology by an integrated services digital network (ISDN) line at the time of the failure of an inter-node repeater line, etc. in a network composed of connection nodes, such as ATM nodes, etc. where a high-speed data transfer is available.

2. Description of the Related Art

In a network composed of ATM nodes where a high-speed data transfer is available, communications between a variety of media terminals accommodated in the node are conducted through a high-speed inter-node repeater line.

Generally speaking, such a network has a repeater line backup function by an ISDN line to make possible the continuation of a communication with no interruption between terminals even at the time of a failure in an inter-node repeater line.

In an ATM switching system, since for a repeater line a high-speed circuit is used to make possible a high-speed data transfer, a high-speed bypass line is also required to set up a bypass line at the time of a failure in a repeater line. To secure this high-speed bypass line, a bulk transfer control to secure a required band by multiplexing the required number (1 to 24 channels) of B channels in an ISDN switching network is performed as shown in FIG. 1.

The required number of B channels varies depending on a band to be secured.

The ISDN backup control has the following problems.

Problem 1

When, for a bypass line, a plurality of ISDN lines are used in a node connected to a plurality of nodes, in order to effectively use the ISDN lines, one ISDN line corresponding to each repeater line is not installed, and the ISDN lines and B channels are dynamically shared. Furthermore, in this operation the plurality of ISDN lines are handled as a pilot, a pilot number is allocated and in each node of a network, control is performed based on only the pilot number. By adopting this method, both the constituent data of each node in the network and the procedures of the line selection can be simplified.

However, since in such an operation the selection of each ISDN line is left to the ISDN switching network side when a bulk transfer by the selection of the plurality of B channels is performed, there is a problem that a required band can often not be secured due to the shortage of B channels for each ISDN line.

To be more specific, for example, it is assumed that when in a node A of FIG. 2 two ISDN backup lines with 23 B channels each are prepared and a failure occurs in a repeater line, a node a connected to the node A performs a bulk transfer by using 6 B channels in a first ISDN backup line, a node b connected to the node A by using the remaining 16 B channels of the first ISDN backup line, a node d connected to the node. A by using 6 B channels of a second ISDN backup line and a node e connected to the node A by using the remaining 6 B channels of the second ISDN backup line. In this state, in order to connect a node c requiring a bulk transfer of 6 B channels, to the node A, a call has to be originated at the pilot number set for the two ISDN backup lines. In this case, without being conscious of the number of B channels required for the bulk transfer, the ISDN switching network simply judges that there are idle B channels in the first ISDN backup line (23 B–(6 B+16 B)>0), and terminates the call connection request for the pilot number of the node A from a node c, to the first ISDN backup line. However, in the first ISDN backup line, since 22 B (=6 B+16 B) channels are already occupied and there is only one idle B channel, the call connection request from the node c requiring the bulk transfer of 6 B channels is refused in the middle of the termination. As a result, although there are still 6 idle B channels in the second ISDN backup line, the call connection request from the node c to the node A fails.

In this way, when a plurality of ISDN backup lines are represented by a pilot number, there is a problem that available idle B channels of an other ISDN backup line can often not be used effectively due to the occupancy of B channels in a part of the ISDN backup lines, which is the first problem.

Problem 2

Next, as shown in problem 1, when ISDN lines and B channels are dynamically shared, a required band (number of B channels) can often not be secured due to the partial concentration of bypass line connections from terminals. In this case, there is a problem that a part of a band for the bypass lines is used in order every time a call is originated from the terminals, and after the entire band is occupied, all new calls are refused to be connected unconditionally regardless of the priority.

SUMMARY OF THE INVENTION

This invention is made in the background described above, and an object of the present invention is to solve problem 1 by implementing the optimum selection of both the number of channels and the interface (ISDN line) needed for a bulk transfer, and to solve problem 2 by implementing a call priority control according to a band for bypass lines.

The first aspect of the present invention comprises connection node apparatuses for controlling the securing of a backup line for a repeater line between the connection node apparatuses by connecting the connection node apparatuses with each other by an ISDN line being an integrated services digital network line in which a bulk transfer by using a plurality of B channels is performed.

A bypass line connection control unit selects an ISDN line for backup in which a bulk transfer by using a plurality of B channels is performed, out of a plurality of ISDN which can be set between the connection node apparatuses, by using a pilot function on an ISDN switching network side in which ISDN are switched over, and simultaneously exchanges the number (child number) of an ISDN to be selected between the connection node apparatuses as user-user information in the D channel message of the ISDN when the ISDN is selected.

A channel management unit selects the ISDN for backup in which a bulk transfer by using a plurality of B channels is performed, based on the numbers to be exchanged.

The configuration of the first aspect of the present invention further comprises a bypass connection control unit for exchanging the number of B channels to be transferred in bulk between connection node apparatuses as user-user information in the D channel message of an ISDN, wherein the channel management unit 303 can be configured to select the ISDN for backup in which a bulk transfer by using a plurality of B channels is performed, based on both numbers and the number of B channels to be exchanged.

According to the first aspect of the present invention, an ISDN line for backup in which a required bulk transfer can be secured, can be precisely and effectively selected by exchanging the line number of an ISDN circuit to be selected as user-user information in the D channel message of the ISDN line.

By exchanging the number of B channels to be transferred in bulk together with the line number, the more precise selection of an ISDN line becomes available.

The second aspect of the present invention presumes a connection node apparatus for performing a call control to control a call from a terminal connected to the connection node apparatus when the backup line of a repeater line between the connection node apparatuses is secured, by connecting the connection node apparatuses with each other by an ISDN line being an integrated services digital network line in which a bulk transfer by a plurality of B channels is performed.

A bypass line band management unit manages the band of an ISDN line.

A call control processor unit controls calls from each terminal based on both the band of the ISDN line and manages a priority for each terminal.

The range to be claimed of the present invention also includes all methods of realizing the same functions as those possessed by systems implemented by the first and second aspects of the connection node apparatus of the present invention described above.

According to the second aspect of the present invention, a call priority control according to a bypass line band can be realized by controlling calls from each terminal based on the band of both an ISDN line for backup and priority information for each terminal. As a result, the serviceability for users can be improved, and simultaneously the effective use of a bypass line band becomes available.

BRIEF DESCRIPTION OF THE DRAWINGS

The other objects and features of the present invention will be more apparent for a person having ordinary skill in the art from the following detailed preferred embodiment in conjunction with the accompanying drawings, in which:

FIG. 6A shows the structure of a repeater line bypass destination management table.

FIG. 6B shows the structure of an ISDN line child number management table.

FIG. 6C shows the structure of an ISDN line channel management table.

FIG. 6D shows the structure of a bypass line band management table.

FIG. 6E shows the structure of a terminal bypass management table.

FIG. 6F shows the structure of a connection destination bypass regulation table.

FIG. 7A and FIG. 7B show the structures of user-user information in SETUP/CONNect/RELease COMplete messages.

FIG. 23 is a flowchart showing the process of an operation command processor unit at the time of the reception of a bypass Yes/No set command.

DESCRIPTION OF THE PREFERRED EMBODIMENT

Principle of the Invention

Before the preferred embodiment of the present invention is described in detail, the principle of the present invention is described.

Figure 1:
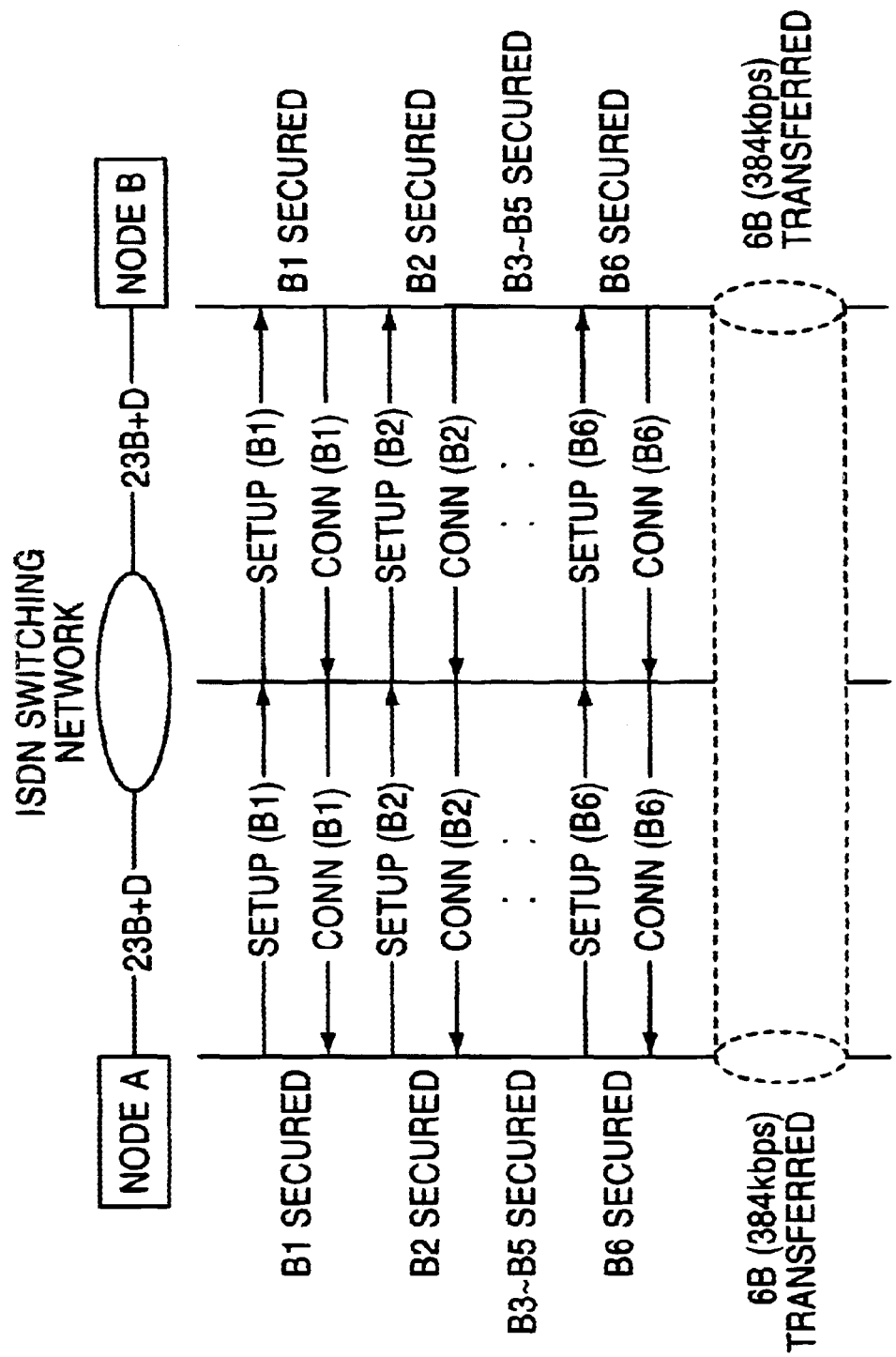
FIG. 1 shows how a bulk transfer is performed.
Figure 2:
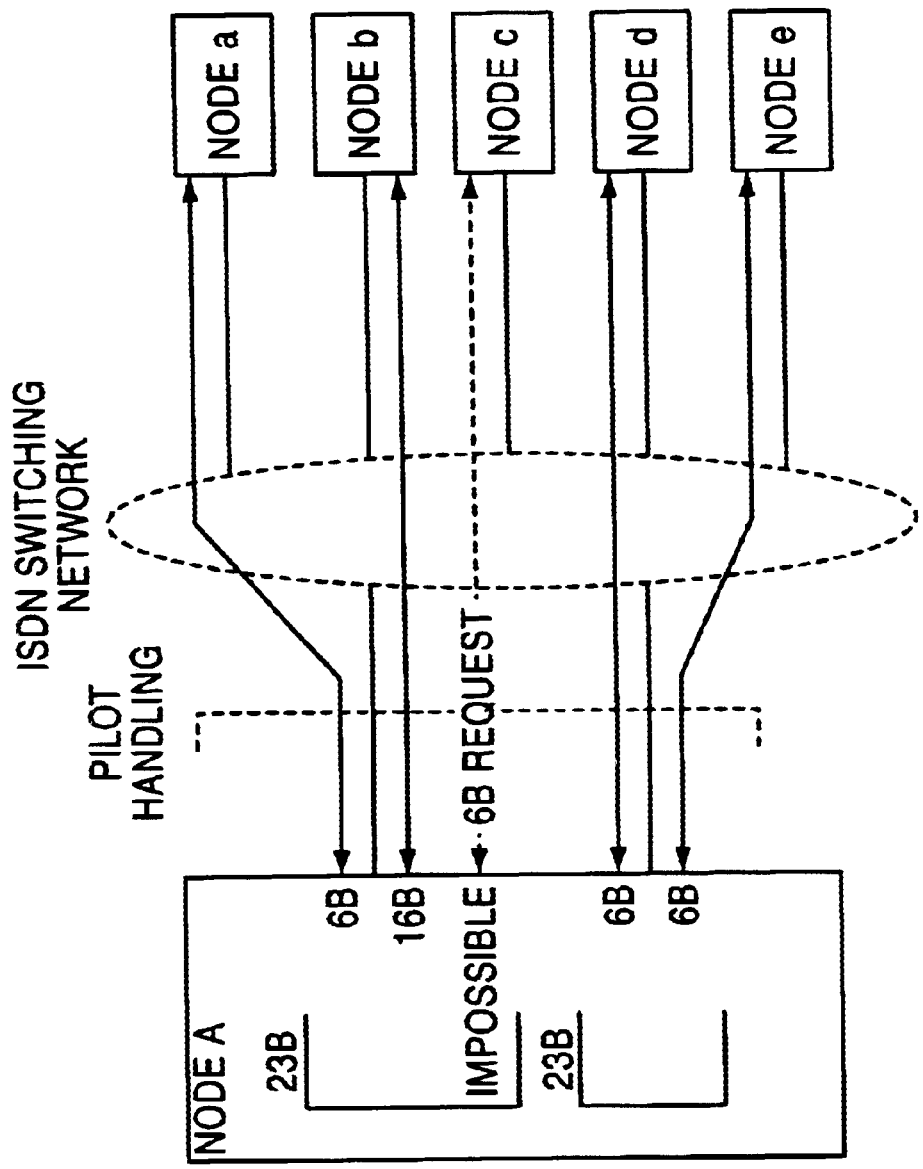
FIG. 2 shows why a required band cannot be secured.
Figure 3A:
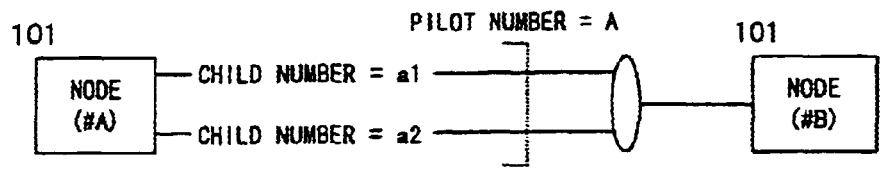
FIG. 3A and FIG. 3B explain the principle of the present invention.
Figure 3B:
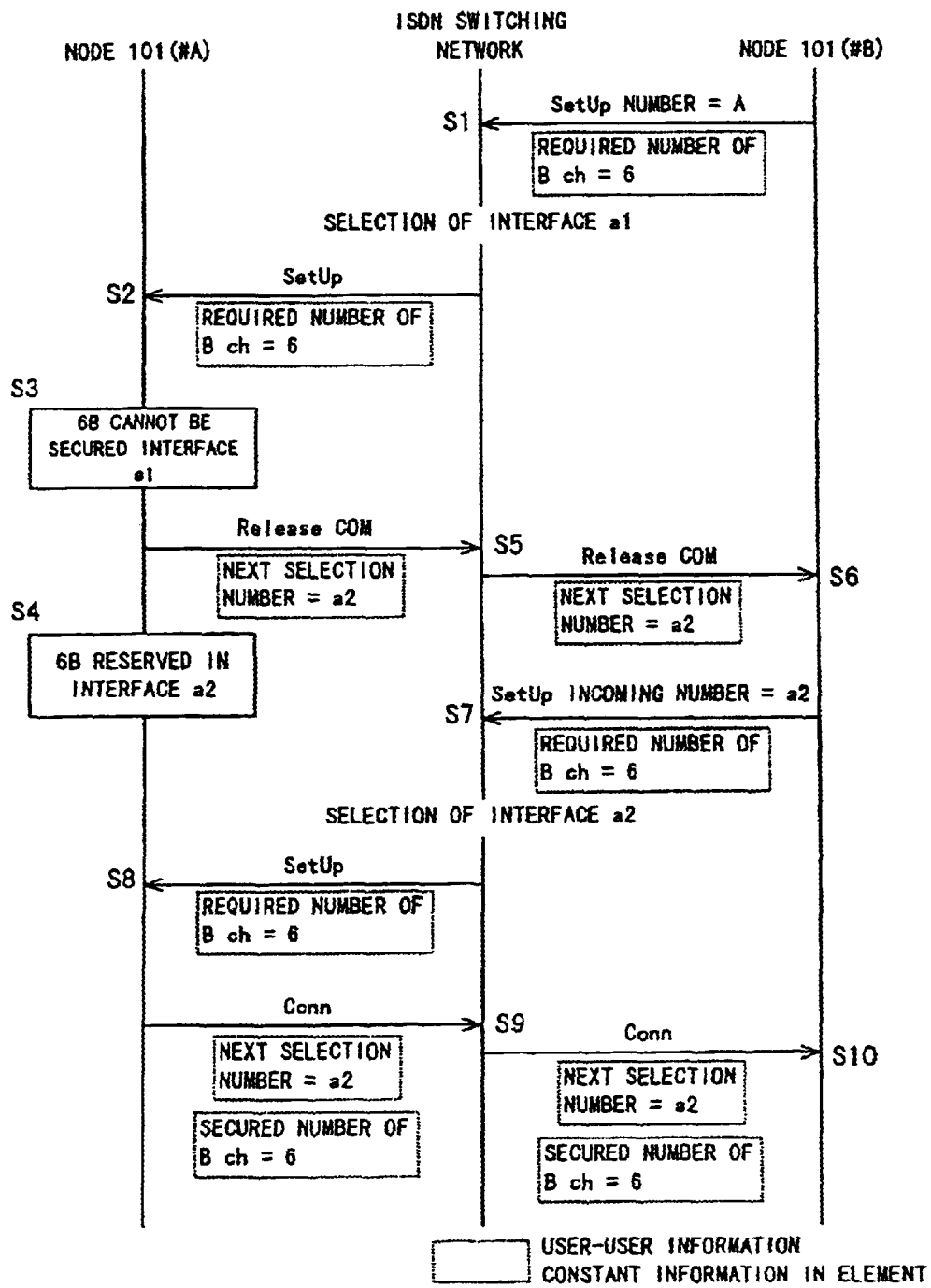

FIGS. 3A and 3B show the principle of the present invention.

First, as shown in FIG. 3A, when a plurality of ISDN lines are connected to one node 101 (#A), the node 101 (#A) is assumed to have both the pilot number (parent number) of the plurality of the ISDN lines and the child number of an individual ISDN line.

In the present invention, first, in order to solve the problem 1 described above, the number of B channels to be transferred in bulk which is needed for the connection of an ISDN backup line, is exchanged between a node 101 (#B) wanting to connect and the node 101 (#A) to be connected to, and steps for making possible the synchronization between the nodes 101 (#A) and 101 (#B) are executed.

At the time of a bypass line connection being required due to a failure in a repeater line, etc., first, the node 101 (#B) on the originating side requesting a backup connection reports the "required number of B channels" by an originating message (SETUP message) in which the pilot number of the node 101 (#A) is designated (S1→S2 in FIG. 3B).

On the other hand, the node 101 (#A) on the incoming side manages management information on busy B channels/idle B channels as a use condition for each ISDN line (child number) connected to the node 101 (#A).

When receiving the "required number of B channels" from the node 101 (#B) from the SETUP message, the node 101 (#A) refers to the management information and judges whether or not the "required number of B channels" can be secured in an interface (ISDN line) selected by an ISDN switching network (S3 in FIG. 3B).

If the "required number of B channels" can be secured, the node 101 (#A) secures (reserves) the B channels in the selected interface (S4 in FIG. 3B), and reports to the node 101 (#B) the "secured number of B channels", an indication that subsequent connections are made in the interface and the child number of the interface by using a connection message (CONNect message)(S9→S10 in FIG. 3B).

If the "required number of B channels" cannot be secured, the node 101 (#A) refers to the management information, selects another interface which can secure the requested "required number of B channels" and secures (reserves) as many B channels as required in that interface (S4 in FIG. 3B). Then, the node 101 (#A) reports to the node 101 (#B) both an indication that subsequent connections are made in the interface and the child number of the interface by using a disconnection completion message (RELease COMplete (REL COM) message) (S5→S6 in FIG. 3B).

The notification of the child number by a CONNect message or RELease COMplete message is made by using the user-user information element in each message.

The securing (reservation) of B channels in another interface by the node 101 (#A) is made for a certain period. During that period, the interface can be selected only in the connection with the target node 101 (#B), and the interface cannot be selected in a connection with other origination nodes 101.

As described earlier, when receiving a child number from a CONNect message or a RELease COMplete message, the node 101 (#B) controls connections by using the reported child number in subsequent connection controls, and secures the remaining B channels needed for a bulk transfer (S7 through S10 in FIG. 3).

Then, in the present invention, in order to solve problem 2 described earlier, the following steps are executed.

First, the node 101 (#A) shown in FIG. 3A stores bypass available/unavailable information for reporting for each terminal interface accommodated in the node 101 (#A) whether or not a call can go through a bypass line under a specific conditions at the time of a backup connection being required due to a failure in a repeater line, etc. This information can be set by using an operation command.

The node 101 (#A) also stores a bypass band restriction value (usable ratio) for a full band in a bypass line made by a backup connection. This information can be set by using an operation command.

Furthermore, the node 101 (#A) measures a bypass band occupancy value for each call generation in a bypass line by using a backup connection.

At the time of a backup connection being required due to a failure in a repeater line, etc. the node 101 (#A) performs the following call relay control based on the bypass available/unavailable information, the bypass band restriction value and the bypass band occupancy value described above.

First, the node 101 (#A) compares the bypass band occupancy value and the bypass band restriction value of the bypass line, and if the bypass band occupancy value is less than the bypass band restriction value, performs a call setting regardless of the bypass available/unavailable information.

If the bypass band occupancy value is greater than the bypass band restriction value, the node 101 (#A) sets up calls from a terminal interface for which the bypass available/unavailable information is set to available, and refuses to set up (disconnects) calls from a terminal interface for which the bypass available/unavailable information is set to unavailable.

By such a call relay control, a call priority control according to the band value of a bypass line becomes available.

Detailed Preferred Embodiment of the Invention

The preferred embodiment of the present invention based on the principle described above is described in detail below.

Figure 4:
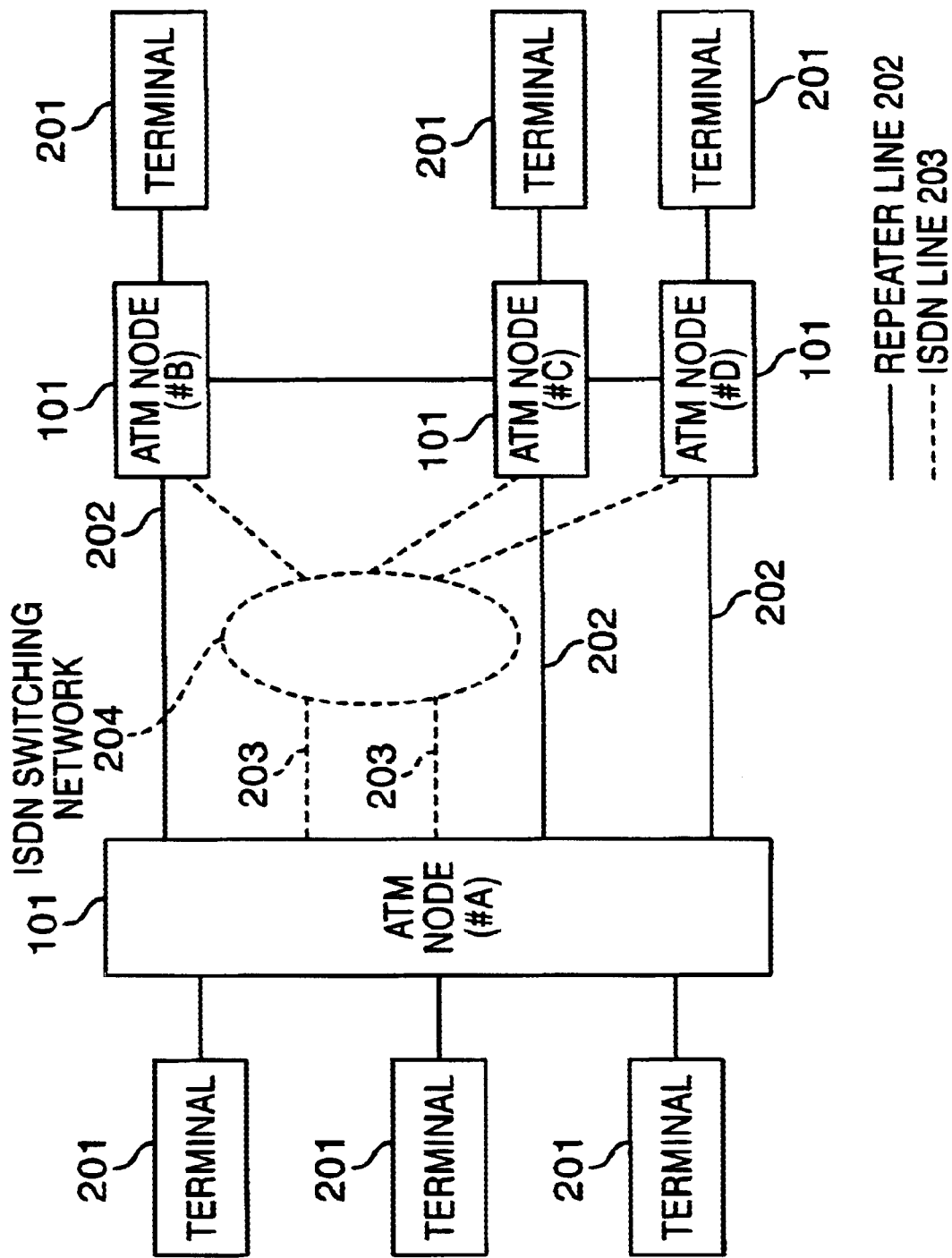
FIG. 4 shows the network configuration of this preferred embodiment.
Figure 5:
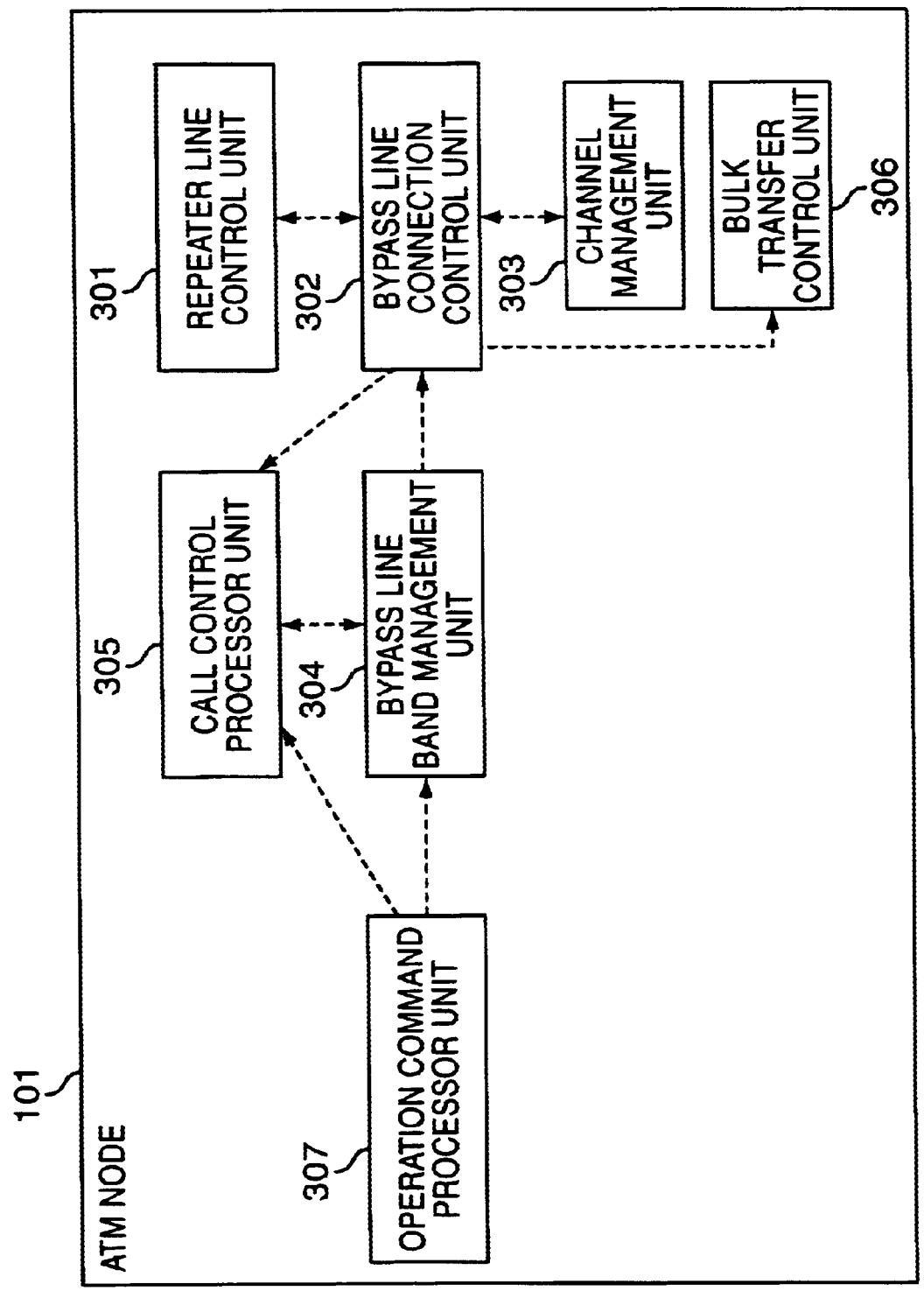
FIG. 5 shows the configuration of the ATM node of this preferred embodiment.

FIG. 4 shows the network configuration of this preferred embodiment, and FIG. 5 shows the configuration of the ATM node 101 shown in FIG. 4.

Each of the ATM nodes 101, such as #A, #B, #C, #D, etc. accommodates terminals 201.

In the same way as shown in FIG. 3A, a plurality of ISDN lines 203 for backup are connected to one ATM node (#A), and both the pilot number (parent number) and the child number of an individual ISDN line 203 are allocated to each of the ISDN lines 203.

At the time of a failure in a repeater line 202, each of ATM nodes 101, #B, #C and #D can access the ATM node 101 (#A) through both an ISDN line 203 and an ISDN switching network 204.

Next, in the configuration of the ATM node 101 shown in FIG. 5, first, a repeater line control unit 301 stores a repeater line bypass destination management table with a configuration as shown in FIG. 6A. This table manages a repeater line ID, a connection node ID, an ISDN connection destination number (pilot number) and the number of bypass channels.

A bypass line connection control unit 302 stores an ISDN line child number management table with a configuration as shown in FIG. 6B. This table manages an ISDN line ID and a child number being its own circuit number for each ISDN line 203.

A channel management unit 303 stores an ISDN line channel management table with a configuration as shown in FIG. 6C. This table manages both status indication (unused/reserved/used) and a connection destination number in the case of "used" for each of B1 through B23 channels being an ISDN line ID for each ISDN line 203.

A bulk transfer control unit 306 controls the execution of a bulk transfer.

A bypass line band management unit 304, a call control processor unit 305 and an operation command processor unit 307 are described later.

Figure 8:
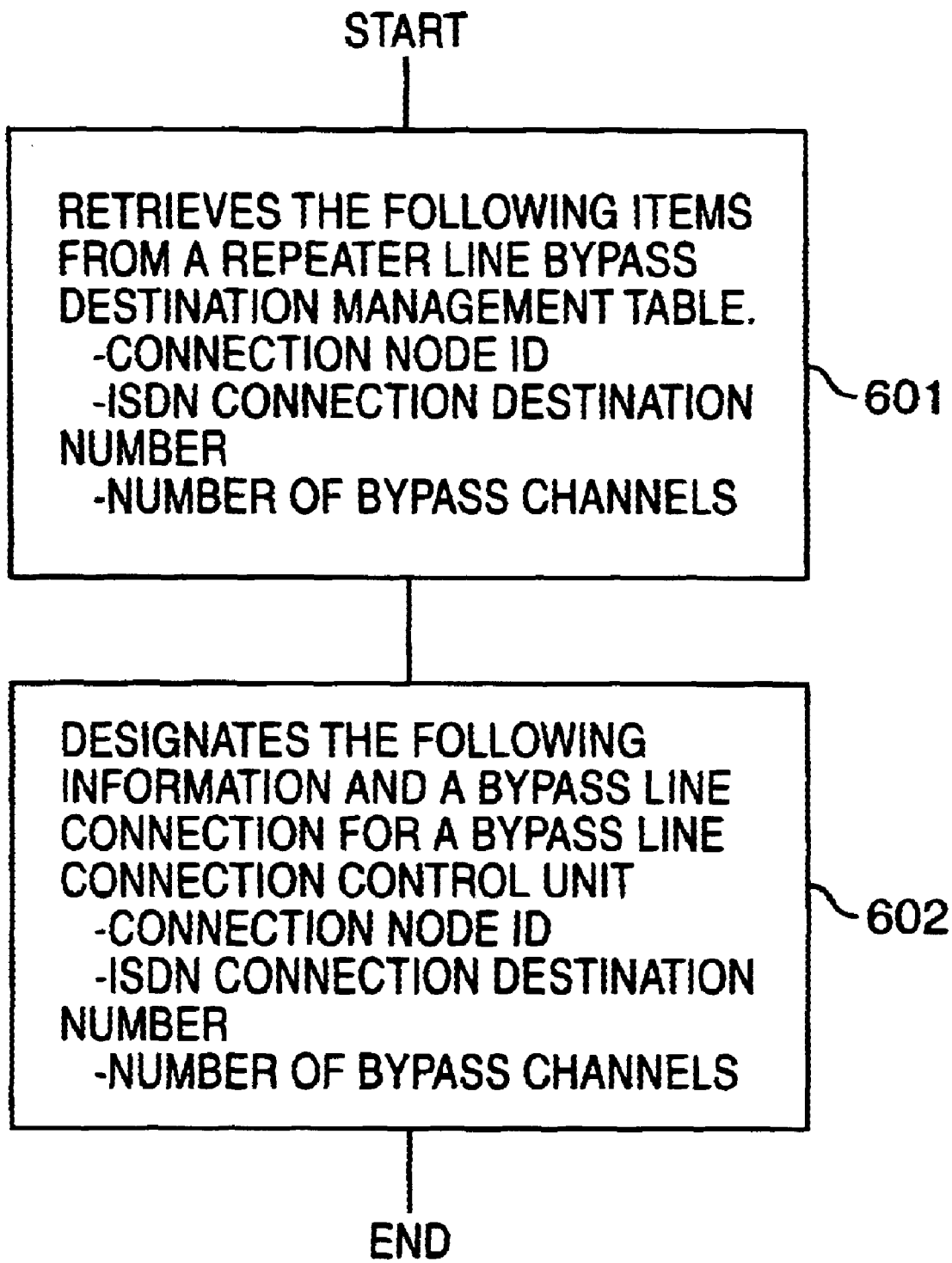
FIG. 8 is a flowchart showing the process of a repeater line control unit at the time of a bypass line connection (origination).

In #B, #C or #D being an ATM node 101 on the originating side, when recognizing a failure of a repeater line 202, the repeater line control unit 301 executes a control process shown by a flowchart in FIG. 8.

First, the repeater line control unit 301 extracts from the repeater line bypass destination management table a connection node ID corresponding to the repeater line ID of the repeater line 202 where the failure is recognized, an ISDN connection destination number (pilot number) and the number of bypass channels (step 601 in FIG. 8).

Then, the repeater line control unit 301 reports the connection node ID, the ISDN connection destination number and the number of bypass channels to the bypass line connection control unit 302, and simultaneously instructs the connection of a bypass line (step 602 in FIG. 8).

Figure 9:
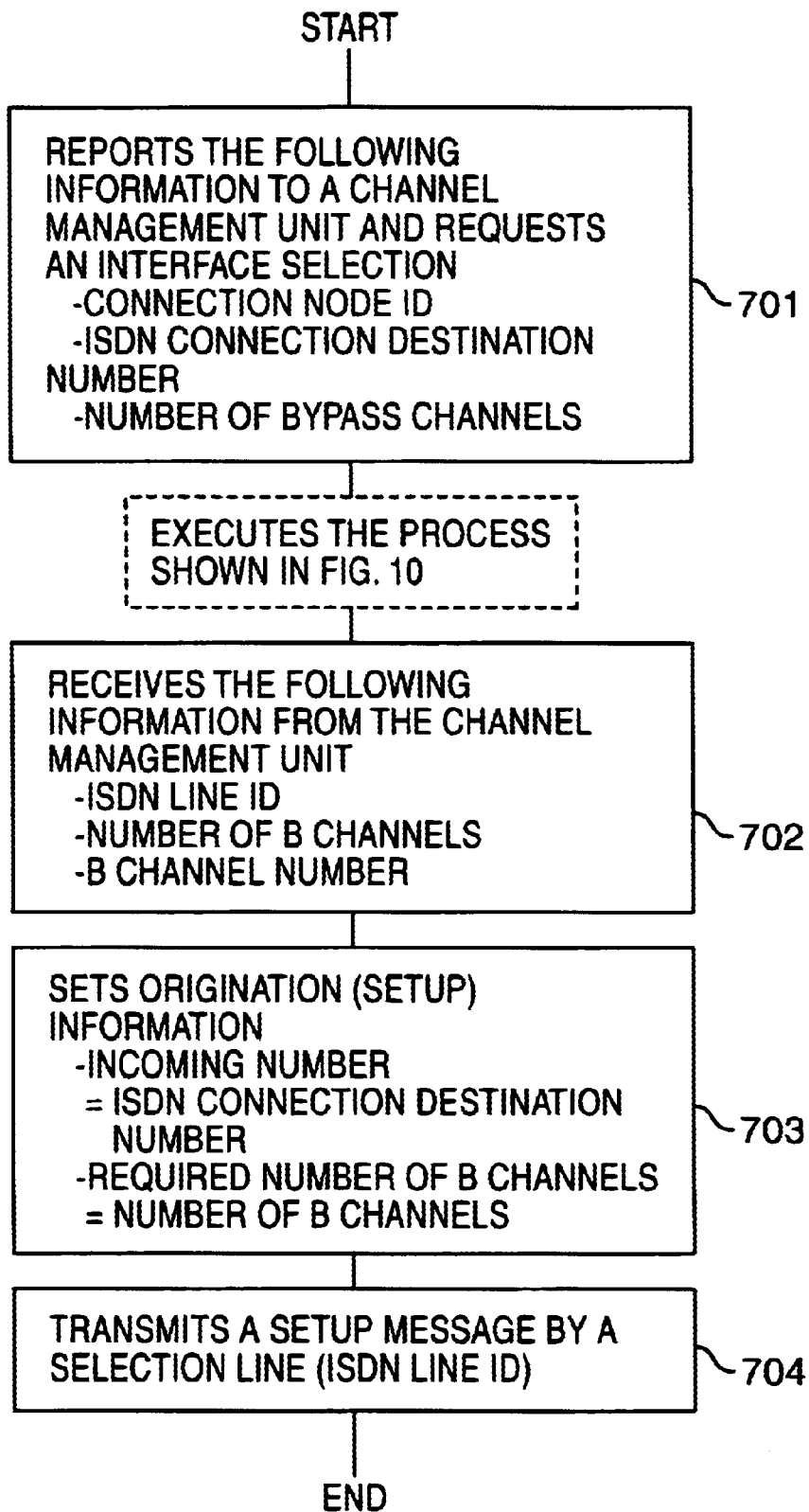
FIG. 9 is a flowchart showing the originating process of a bypass line connection control unit at the time of the commencement of a bypass line connection.

In the ATM node 101 on the originating side, when receiving the connection instruction of a bypass line from the repeater line control unit 301, the bypass line connection control unit 302 executes a control process shown by a flowchart in FIG. 9.

First, the bypass line connection control unit 302 reports to the channel management unit 303 both the ISDN connection destination number and the number of bypass channels (number of B channels) received from the repeater line control unit 301, and requests the channel management unit 303 to select an interface in which the number of B channels to be secured are idle (step 701 in FIG. 9).

Figure 10:
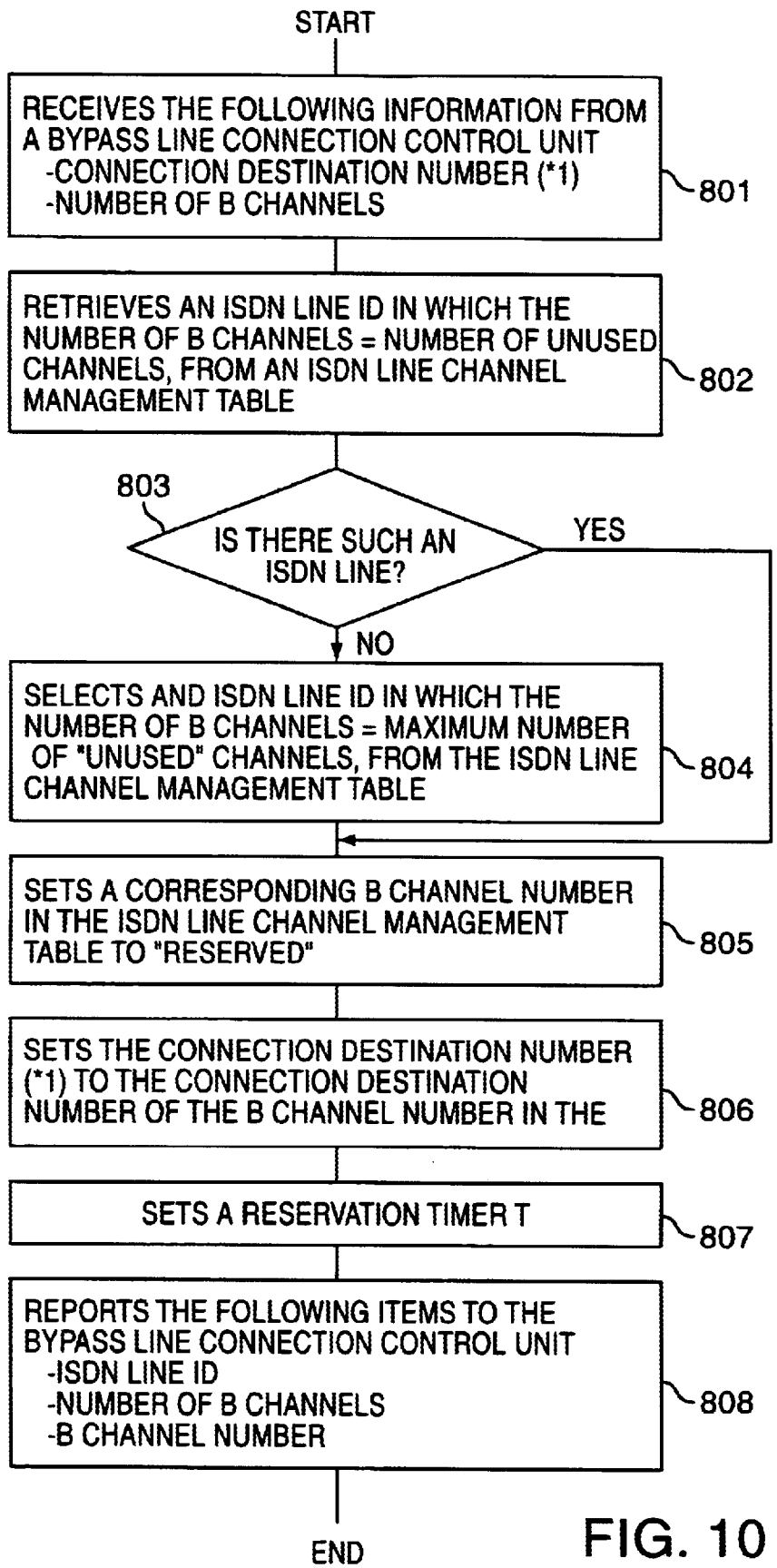
FIG. 10 is a flowchart showing the process of a channel management unit at the time of the origination in the commencement of a bypass circuit connection.

In the ATM node 101 on the originating side, when being requested to select an interface by the bypass line connection control unit 302 as described above, the channel management unit 303 executes a control process shown by a flowchart in FIG. 10.

First, the channel management unit 303 receives from the bypass line connection control unit 302 both the ISDN connection destination number and the number of bypass channels (number of B channels) (step 801 in FIG. 10).

Then, the channel management unit 303 retrieves from an ISDN line channel management table shown in FIG. 6C an ISDN line ID in which B channels of a number equivalent to the reported number of B channels are "unused" (step 802 in FIG. 10), and judges whether or not there is such an ISDN line ID (step 803 in FIG. 10).

If it is judged that there is no ISDN line ID in which B channels of a number equivalent to the reported number of B channels are "unused" (when the judgement in step 803 of FIG. 10, is No), the channel management unit 303 selects from the ISDN line channel management table an ISDN line in which the number of "unused" B channels is a maximum (step 804 in FIG. 10).

If it is judged that there is an ISDN line ID in which B channels of a number equivalent to the reported number of B channels are "unused" (when the judgement in step 803 of FIG. 10, is Yes), or after the process of step 804 in FIG. 10, the channel management unit 303 resets the status of the "unused" B channels corresponding to the ISDN ID in the ISDN line channel management table, to "reserved" (step 805 in FIG. 10).

Then, the channel management unit 303 resets the connection destination number reported by the bypass line connection control unit 302 in step 801 of FIG. 10, to the connection destination number of the B channels whose status is reset to "reserved" as described above in the ISDN circuit channel management table (step 806 in FIG. 10).

Simultaneously, the channel management unit 303 sets up a reservation timer T and reserves the B channels whose status is reset to "reserved" for a certain period (step 807 in FIG. 10).

Lastly, the channel management unit 303 reports to the bypass connection control unit 302 the ISDN line ID, the number of B channels and B channel numbers which are secured in steps 802 and 804 of FIG. 10 (step 808 in FIG. 10).

Back in FIG. 9, in the ATM node 101 on the originating side, the bypass line connection control unit 302 receives from the channel management unit 303 the secured ISDN line ID, the number of B channels and B channel numbers (step 702 in FIG. 9).

The bypass line connection control unit 302 generates origination information (a SETUP message) in which an ISDN connection destination number (pilot number of the ATM node 101 (#A) in FIG. 4) reported by the repeater line control unit 301 in step 701 of FIG. 9 as an incoming number and the number of B channels reported by the channel management unit 303 in step 702 of FIG. 9 as the required number of B channels, are set up (step 703 in FIG. 9). In this case, the required number of B channels is set in the first octet (see FIG. 7B) of user information in the user-user information element with a data format shown in FIGS. 7A and 7B of the SETUP message. Although not shown in FIGS. 7A and 7B, the number of the ISDN line 203 of its own ATM node 101 corresponding to the ISDN line ID reported by the channel management unit 303 in step 702 of FIG. 9, is set as an originating number in the SETUP message, and simultaneously one of the B channel numbers reported by the channel management unit 303 in step 702 of FIG. 9 is also set there.

Lastly, the bypass line connection control unit 302 transmits the SETUP message to an ISDN line 203 corresponding to the ISDN line ID reported by the channel management unit 303 in step 702 of FIG. 9.

The operation described above corresponds to the sequences S1 and S2 shown in FIG. 3B.

Figure 11:
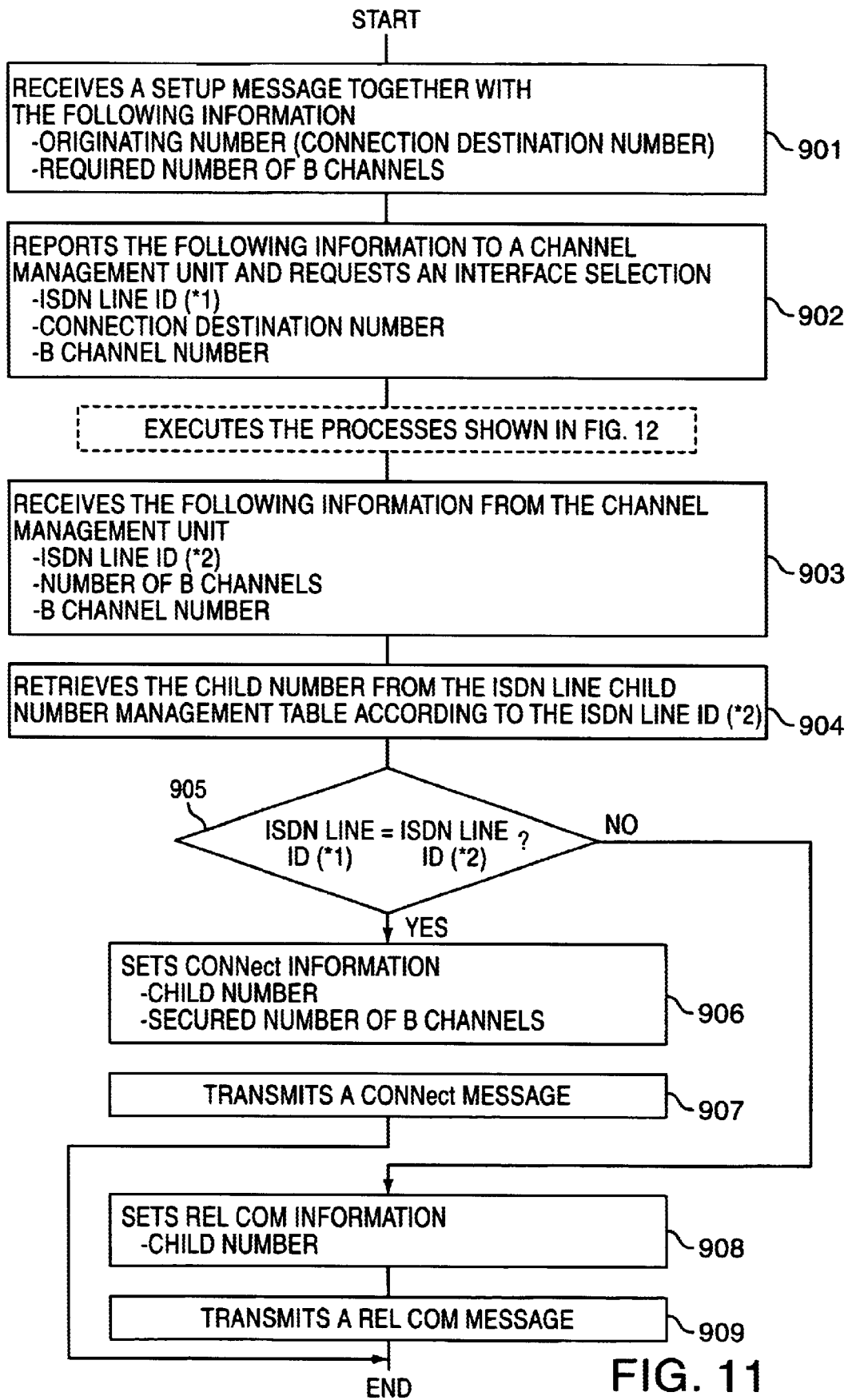
FIG. 11 is a flowchart showing the process of a bypass line connection control unit at the time of a bypass line connection (termination).

Then, in the ATM node 101 (#A) on the incoming side, when the SETUP message arrives at one of the ISDN lines 203 from the ATM node 101 on the originating side, the bypass line connection control unit 302 executes a control process shown by a flowchart in FIG. 11.

First, the bypass line connection control unit 302 extracts from the SETUP message both an originating number (connection destination number of the ISDN line 203 of the ATM node 101 on the originating side) and the required number of B channels set in a user-user information element (see FIG. 7B) (step 901 in FIG. 11).

Then, the bypass line connection control unit 302 reports the ISDN line ID of the ISDN circuit 203 at which the SETUP message arrives to the channel management unit 303, and a connection destination number and the required number of B channels extracted in step S901 of FIG. 11, and requests an interface selection (step 902 in FIG. 11).

Figure 12:
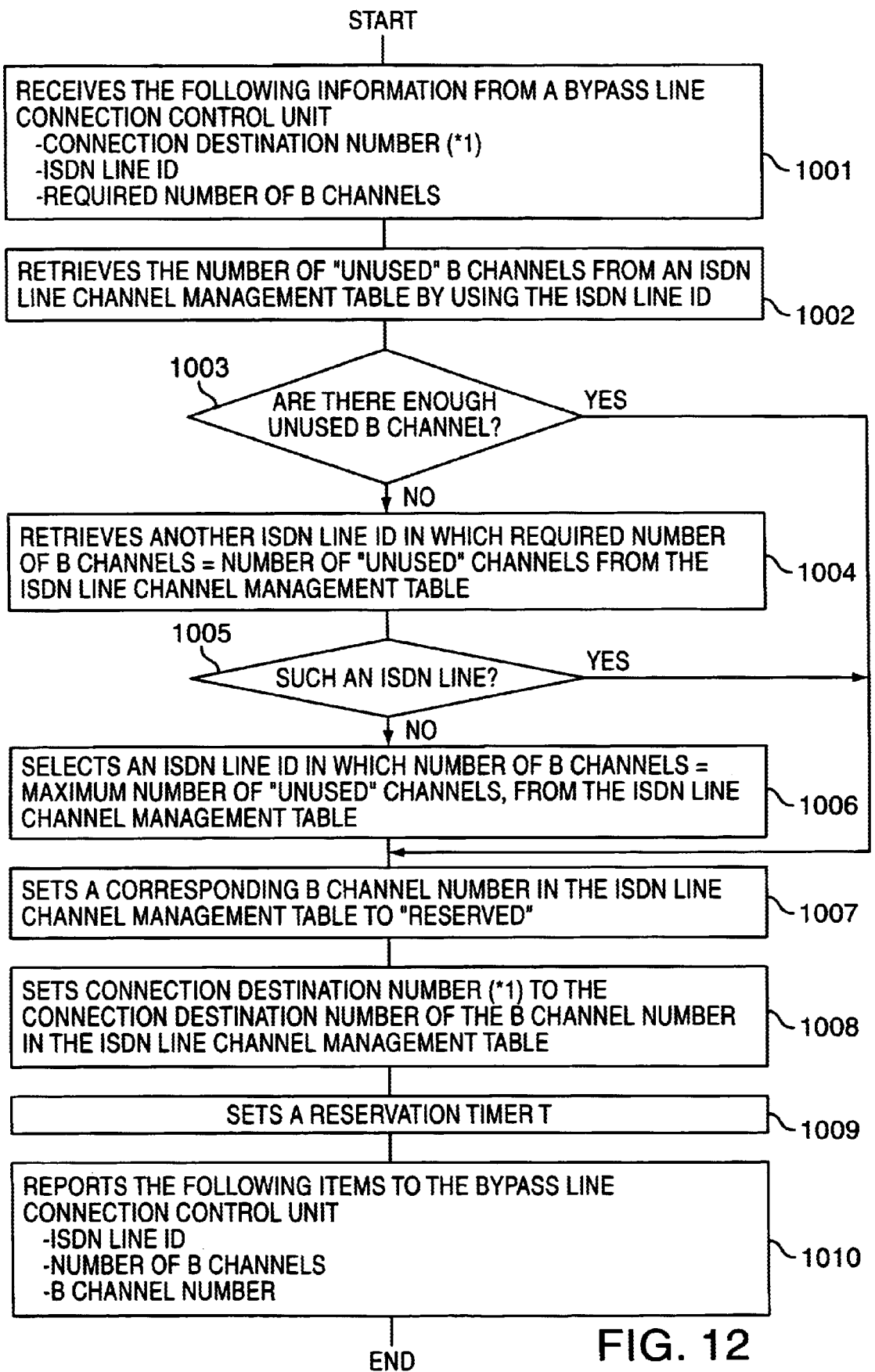
FIG. 12 is a flowchart showing the process of a channel management unit at the time of the reception of a SETUP message.

In the ATM node 101 on the incoming side, when being requested to perform the interface selection by the bypass line connection unit 302, the channel management unit 303 executes a control process shown by a flowchart in FIG. 12.

First, the channel management unit 303 receives from the bypass line connection control unit 302 the connection destination number, the ISDN line ID and the required number of B channels (step 1001 in FIG. 12).

Then, the channel management unit 303 retrieves "unused" B channels of a number equivalent to the reported required number of B channels in the reported ISDN line ID from the ISDN line channel management table shown in FIG. 6C (step 1002 in FIG. 12), and judges whether or not there are enough "unused" B channels (step 1003 in FIG. 12).

If it is judged that there are no "unused" B channels of a number equivalent to the required number of B channels in the ISDN lines ID (when the judgement in step 1003 of FIG. 12, is No), the channel management unit 303 retrieves from the ISDN line channel management table an ISDN line ID in which there are "unused" B channels of a number equivalent to the required number of B channels (step 1004 in FIG. 12), and judges whether or not there is such an ISDN line ID (step 1005 in FIG. 12).

If it is judged that there is no ISDN line ID in which "unused" B channels of a number equivalent to the required number of B channels (when the judgement in step 1005 of FIG. 12, is No), the channel management unit 303 selects an ISDN line ID in which the number of "unused" B channels is a maximum (step 1006 in FIG. 12).

If the judgement in step 1003 or 1005 of FIG. 12 is Yes, or after the process of step 1006 in FIG. 12, the channel management unit 303 resets the status of the "unused" B channels corresponding to the ISDN line ID in the ISDN line channel management table, to "reserved" (step 1007 in FIG. 12).

Then, the channel management unit 303 resets the connection destination number reported by the bypass line connection control unit 302 in step 1001 in FIG. 12 to the connection destination number of the B channels whose status is changed to "reserved" as described above, in the ISDN line channel management table (step 1008 in FIG. 12).

Simultaneously, the channel management unit 303 sets up a reservation timer T and reserves the B channels whose status is reset to "reserved" for a certain period (step 1009 in FIG. 12).

Lastly, the channel management unit 303 reports to the bypass line connection control unit 302 the ISDN line ID, the number of B channels and the B channel numbers which are secured in step 1002, 1004 or 1006 of FIG. 12 (step 1010 in FIG. 12).

Back in FIG. 11, in the ATM node 101 on the incoming side, the secured ISDN line ID, the number of B channels and the B channel numbers are reported from the channel management unit 303 to the bypass line connection control unit 302 (step 903 in FIG. 11).

The bypass line connection control unit 302 retrieves a child number corresponding to the ISDN ID reported by the channel management unit 303 in step 903 of FIG. 11 from the ISDN line child number management table shown in FIG. 6B (step 904 in FIG. 11).

Then, the bypass line connection control unit 302 judges whether or not the ISDN line ID of an ISDN line 203 at which the SETUP message described earlier arrives, matches the ISDN line ID reported by the channel management unit 303 in step 903 of FIG. 11 (step 905 in FIG. 11).

If this judgement is Yes, that is, if the required number of B channels required by the SETUP message in the ISDN line ID of the ISDN circuit 203 at which the SETUP message arrives, or if a currently available maximum number of B channels can be secured, the child number retrieved in step 904 of FIG. 11 is set up as next selection child number information, and simultaneously the bypass line connection control unit 302 generates a CONNect message in which the number of B channels reported by the channel management unit 303 in step 903 of FIG. 11 is set as secured number of B channels (step 906 in FIG. 11), and transmits the CONNect message to the ISDN line 203 at which the SETUP message arrives (step 907 in FIG. 11). The next selection child number information is set in the second octet and after (see FIG. 7B) of the user information in the user-user information element with data formats as shown in FIGS. 7A and 7B of the SETUP message, and the secured number of B channels is set in the first octet (see FIG. 7B) of the user information.

The operation described above corresponds to the sequence S9 shown in FIG. 3B.

On the other hand, if the judgement in step 905 of FIG. 11 is No, that is, if the required number of B channels required by the SETUP message cannot be secured in the ISDN line ID of the ISDN line 203 at which the SETUP message arrives, the bypass line connection control unit 302 generates a RELease COMplete (REL COM) message in which the child number retrieved in step 904 of FIG. 11 is set up as next selection child number information (step 908 in FIG. 11), and transmits the RELease COMplete message to the ISDN line 203 at which the SETUP message arrives (step 909 in FIG. 11). Next selection child number information is set in the second octet and after (see FIG. 7B) of the user information in the user-user information element with data formats shown in FIGS. 7A and 7B of the SETUP message.

The operation described above corresponds to the sequences S3 through S6 shown in FIG. 3B.

Figure 13:
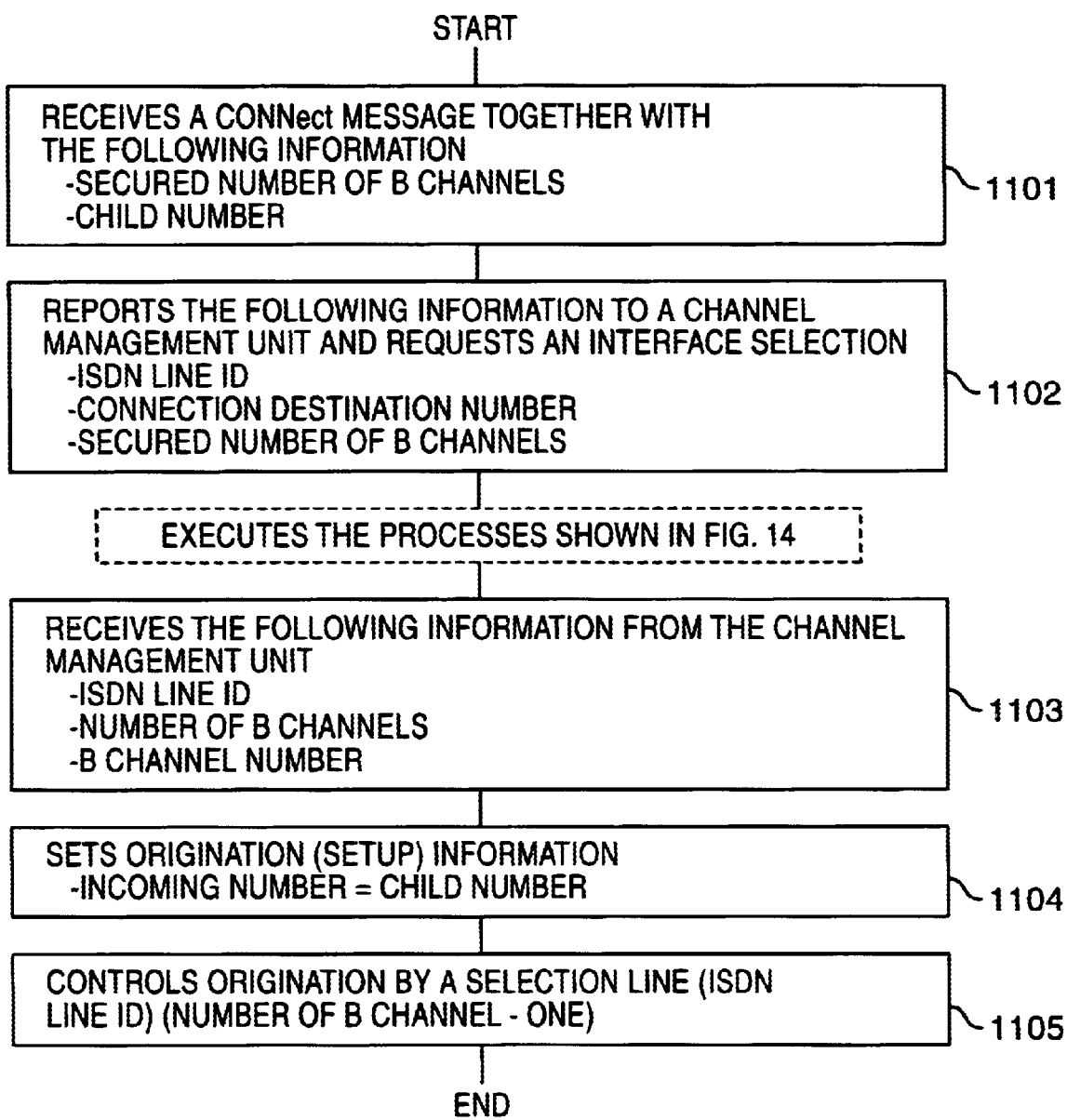
FIG. 13 is a flowchart showing the process of a bypass line connection control unit at the time of the reception of a CONNect message.

In the ATM node 101 on the originating side, when the CONNect message arrives at the ISDN line 203 transmitting the SETUP message from the ATM node 101 on the incoming side (see steps 906 and 907 in FIG. 11), the bypass line connection control unit 302 executes a control process shown by a flowchart in FIG. 13.

First, the bypass line connection control unit 302 extracts both the secured number of B channels and a child number from the user-user information element of the CONNect message (step 1101 in FIG. 13).

Then, the bypass line connection control unit 302 reports to the channel management unit 303 an ISDN line ID corresponding to an ISDN line 203 at which the CONNect message arrives, an ISDN connection destination number received from the repeater line control unit 301 in step 701 of FIG. 9, and the secured number of B channels, and requests an interface selection (step 1102 in FIG. 13).

Figure 14:
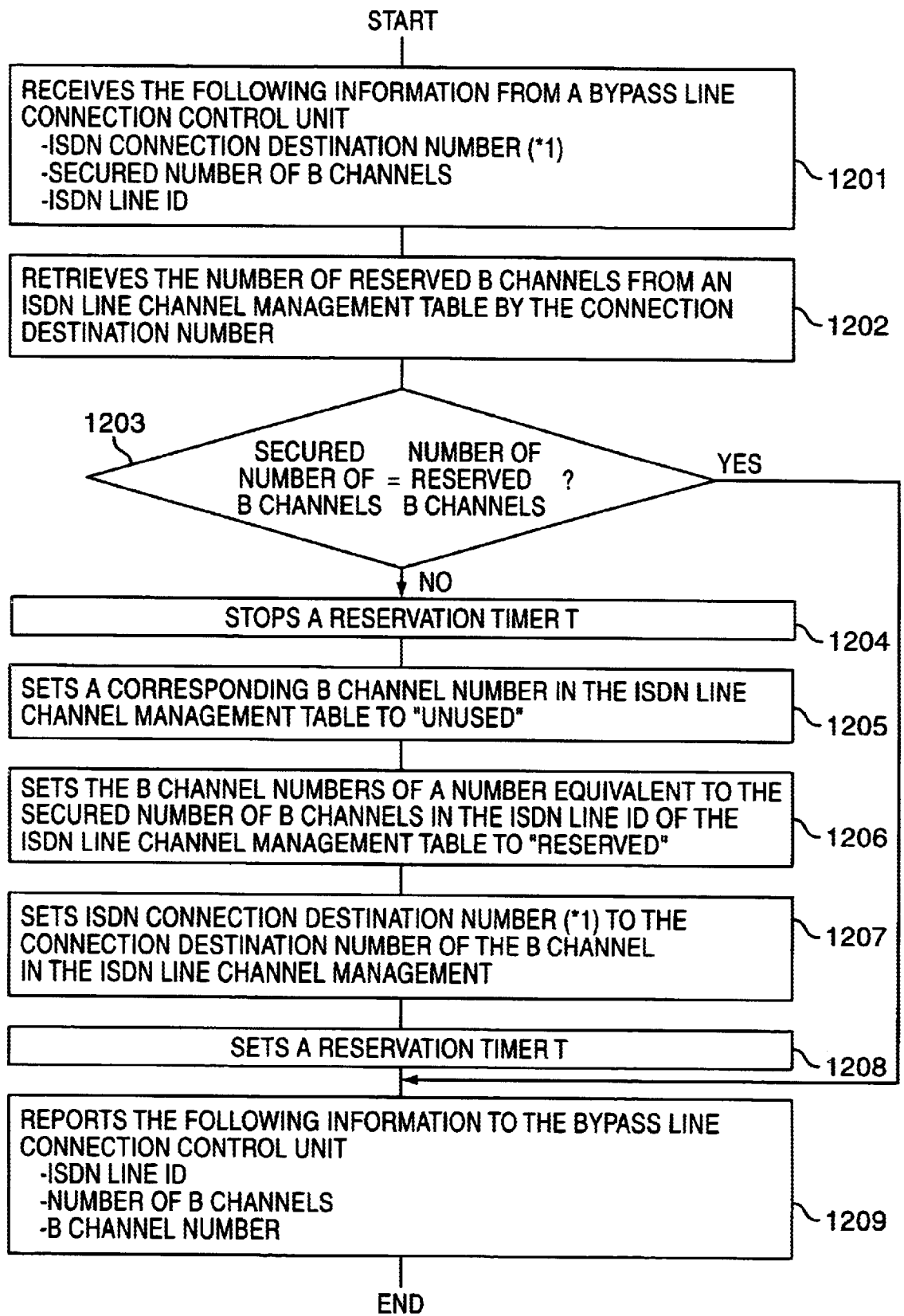
FIG. 14 is a flowchart showing the process of a channel management unit at the time of the reception of a CONNect message.

In the ATM node 101 on the originating side, when at the time of the arrival of the CONNect message the interface selection is requested from the bypass line connection control unit 302, the channel management unit 303 executes a control process shown by a flowchart in FIG. 14.

First, the channel management unit 303 receives from the bypass line connection control unit 302 the ISDN line ID, the ISDN connection destination number and the secured number of B channels (step 1201 in FIG. 14).

The channel management unit 303 retrieves both B channel number which corresponds to the ISDN line ID, in which the ISDN connection destination number is set and which is "reserved", and the number thereof from the ISDN line channel management table shown in FIG. 6C (step 1202 in FIG. 14).

The channel management unit 303 judges whether or not the number of the secured B channels received from the bypass line connection control unit 302 in step 1201 of FIG. 14 is equal to the number of the retrieved B channels (step 1203 in FIG. 14).

If this judgement is Yes, the channel management unit 303 reports both the ISDN line ID reported by the bypass line connection control unit 302 in step 1201 of FIG. 14, and the number of B channels and B channel number retrieved in step 1202 of FIG. 14, to the bypass line connection control unit 302 (step 1209 in FIG. 14).

On the other hand, when the number of secured B channels received from the bypass line connection control unit 302 in step 1201 of FIG. 14 is less than the number of B channels retrieved in step 1202 of FIG. 14 and the judgement in step 1203 of FIG. 14 is No, the channel management unit 303 stops a reservation timer T (see step 807 in FIG. 10) for the time being (step 1204 in FIG. 14) and sets the status of the B channel number in the ISDN channel management table retrieved in step 1202 of FIG. 14 to "unused" (step 1205 in FIG. 14).

Then, the channel management unit 303 newly retrieves "unused" B channels of a number equivalent to the secured B channels corresponding to the ISDN line ID received from the bypass line connection control unit 302 in step 1201 of FIG. 14, and sets the statuses of those B channels to "reserved" (step 1206 in FIG. 14).

Then, the channel management unit 303 sets the connection destination number reported by the bypass line connection control unit 302 in step S1201 of FIG. 14 in the connection destination number of the B channels whose status is changed to "reserved" as described above in the ISDN line channel management table (step S1207 in FIG. 14).

Then, the channel management unit 303 resets the connection destination number reported by the bypass line connection control unit 302 in step 1201 of FIG. 14 to the connection destination number of the B channels whose status is reset to "reserved" as described above in the ISDN line channel management table (step 1207 in FIG. 14).

Simultaneously, the channel management unit 303 sets up a reservation timer T and reserves the B channels whose status is reset to "reserved", for a certain period (step 1208 in FIG. 14).

Then, the channel management unit 303 reports to the bypass line connection control unit 302 both the ISDN line ID and the secured number of B channels reported by the bypass line connection control unit 302 in step 1201 of FIG. 14, and the number of the B channel whose status is reset to "reserved" in step 1206 of FIG. 14 (step 1209 in FIG. 14).

Back in FIG. 13, in the ATM node 101 on the originating side, when receiving the CONNect message, the bypass line connection control unit 302 obtains the ISDN line ID, the number of B channels and the B channel number from the channel management unit 303 (step 1103 in FIG. 13).

Then, the bypass line connection control unit 302 generates a SETUP message in which the child number extracted from the CONNect message received in step 1101 of FIG. 13 is set as an incoming number (step 1104 of FIG. 13).

After that, the bypass line connection control unit 302 executes connection sequences by using a number obtained by subtracting one from the secured number of B channels extracted from the CONNect message in step 1101 of FIG. 13 (step 1105 of FIG. 13). In this case, although not shown in FIG. 13, each B channel number reported by the channel management unit 303 in step 1103 of FIG. 13 is set in each SETUP message in order.

Figure 15:
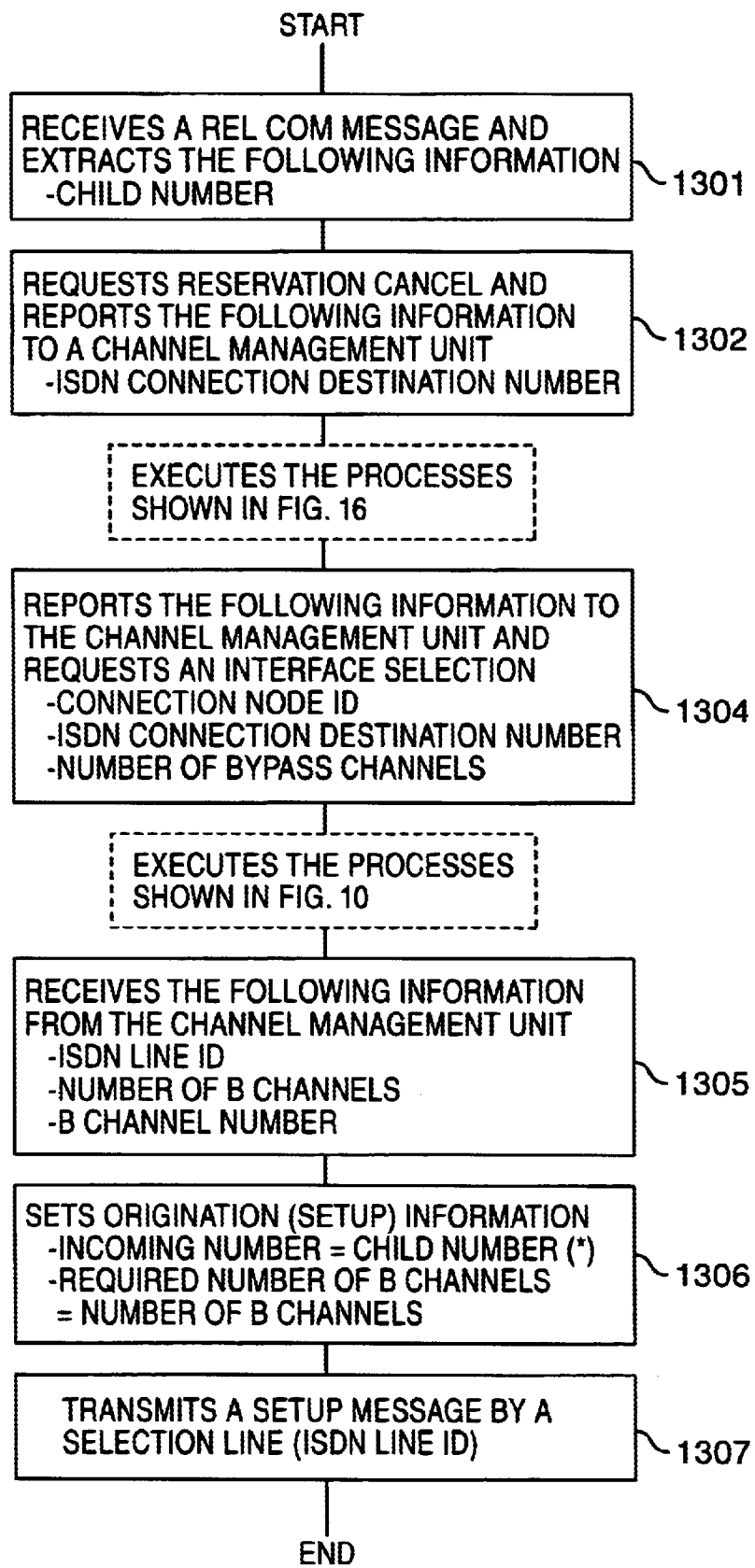
FIG. 15 is a flowchart showing the originating process of a bypass circuit connection control unit at the time of the reception of a RELease COMplete message.

Then, in the ATM node 101 on the originating side, when the RELease COMplete message described earlier arrives at the ISDN line 203 transmitting the SETUP message from the ATM node 101 on the incoming side (see steps 908 and 909 in FIG. 11), the bypass line connection control unit 302 executes a control process shown by a flowchart in FIG. 15.

First, the bypass line connection control unit 302 extracts a child number from the user-user information element of the RELease COMplete message (step 1301 in FIG. 15).

Then, the bypass line connection control unit 302 reports to the channels management unit 303 the ISDN connection destination number received from the repeater control unit 301 in step 701 in FIG. 9, and requests a reservation cancel (step 1302 in FIG. 15).

Figure 16:
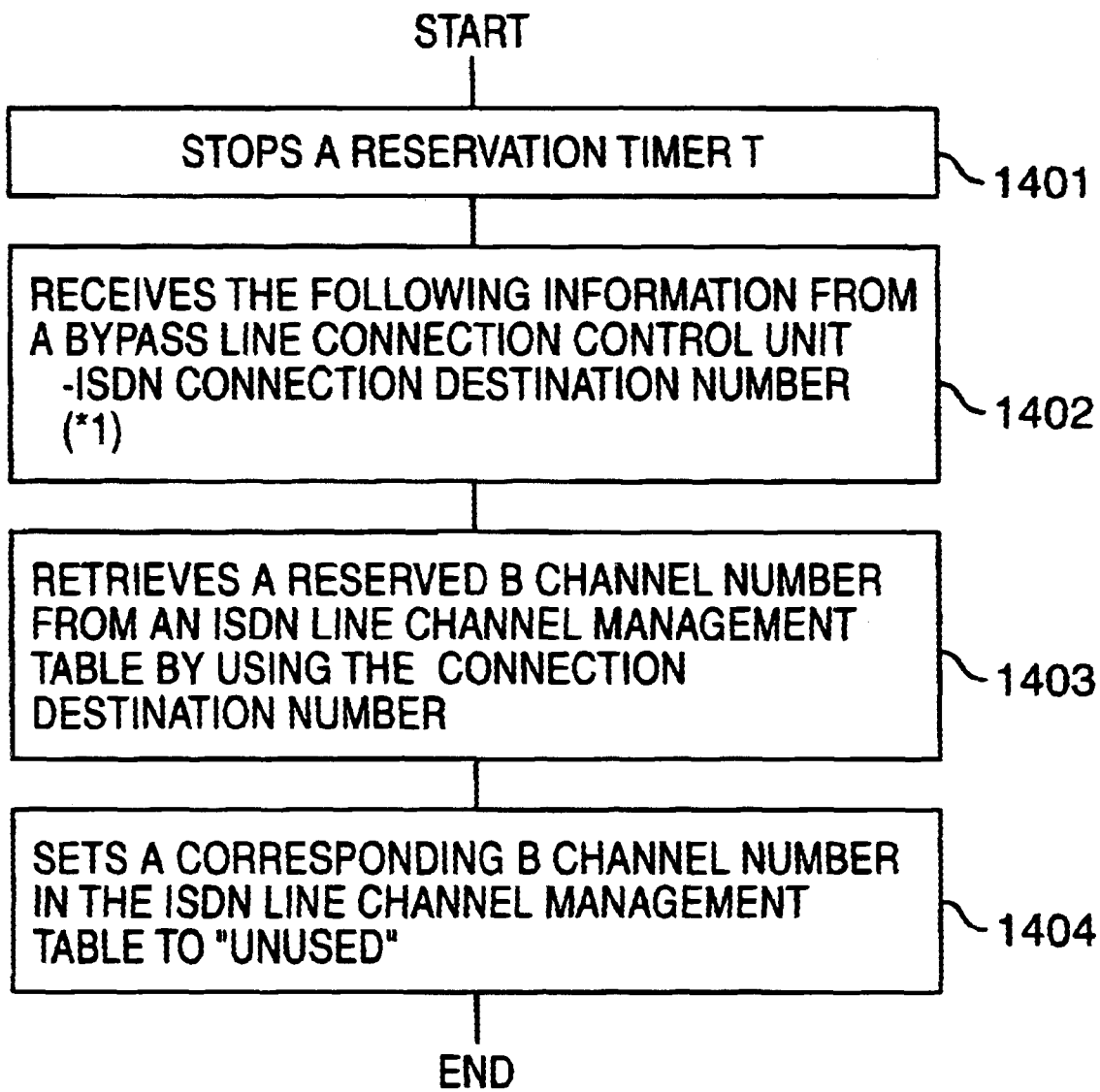
FIG. 16 is a flowchart showing the process of a channel management unit at the time of the reception of a RELease COMplete message.

In the ATM node 101 on the originating side, when receiving the reservation cancel from the bypass line connection control unit 302 at the time of the arrival of the RELease COMplete message, the channel management unit 303 executes a control process shown by a flowchart in FIG. 16.

First, the channel management unit 303 stops a reservation timer T (step 1401 in FIG. 16).

Then, the channel management unit 303 receives an ISDN connection destination number from the bypass line connection control unit 302 (step 1402 in FIG. 16).

Then, the channel management unit 303 retrieves from the ISDN line channel management table shown in FIG. 6C a B channel number in which the ISDN connection destination number is set and is indicated "reserved" (step 1403 in FIG. 16).

Then, the channel management unit 303 sets the status of the retrieved B channel number to "unused" in the ISDN line channel management table (step 1404 in FIG. 16).

After the operation of the channel management unit 303 described above, back in FIG. 15, in the ATM node 101 on the originating side, when receiving the RELease COMplete message, the bypass line connection control unit 302 sets the child number extracted from the RELease COMplete message received in step 1301 of FIG. 15 as incoming number to be stored in the SETUP message in step 1306 of FIG. 15, and executes the same control processes in steps 1304 through 1307 of FIG. 15 as those in the flowchart of FIG. 9 described earlier.

The operation described above corresponds to the sequences S7 and S8 shown in FIG. 3B.

Figure 17:
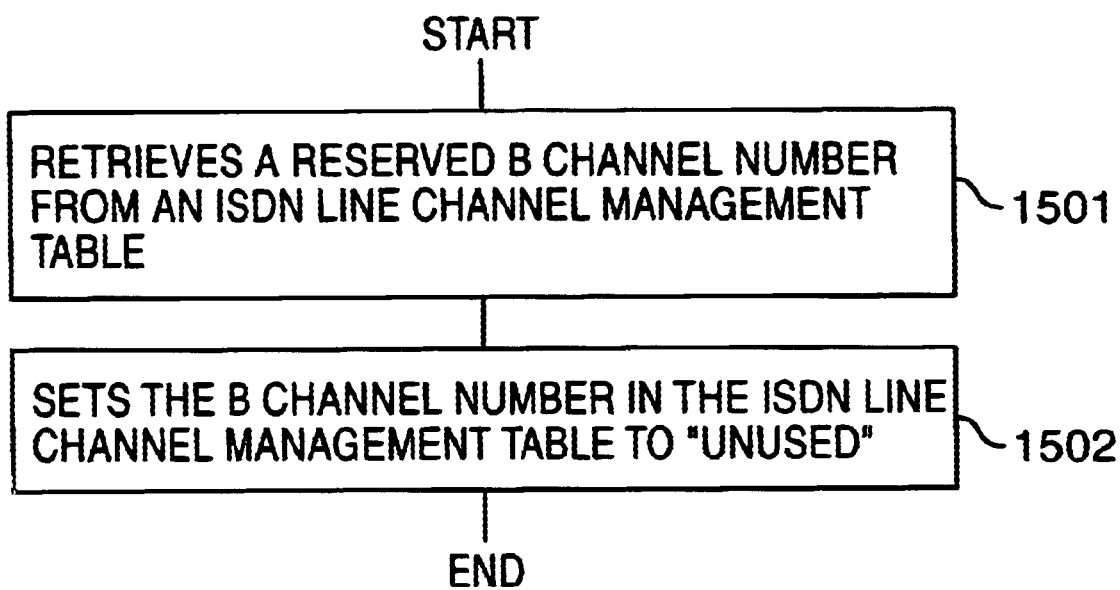
FIG. 17 is a flowchart showing the process of a channel management unit at the time of a reservation timer time-out.

In the series of processes in each of ATM nodes on the originating and incoming side described above, when in the channel management unit 303, the reservation timer T of a "reserved" B channel whose reservation timer T is set by the control processes of step 807 in FIG. 10, step 1009 in FIG. 12 and step 1208 in FIG. 14 described earlier, times out, the channel management unit 303 executes a control process shown by a flowchart in FIG. 17.

First, the channel management unit 303 retrieves a "reserved" B channel from the ISDN line channel management table shown in FIG. 6C (step 1501 in FIG. 17).

Then, the channel management unit 303 sets the status of the retrieved B channel to "unused" in the ISDN line channel management table (step 1502 in FIG. 17).

Figure 18:
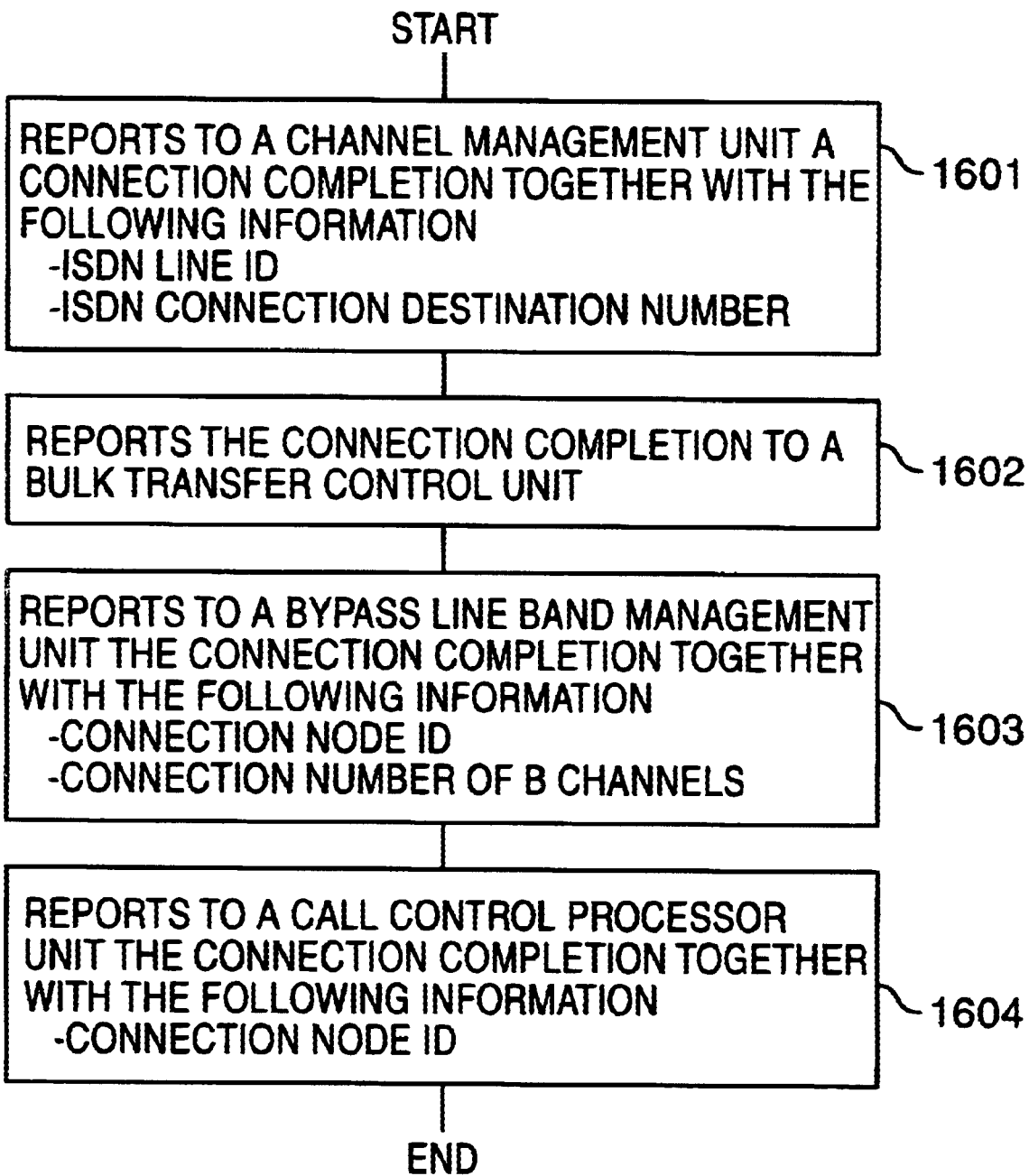
FIG. 18 is a flowchart showing the process of a bypass line control unit at the time of the completion of a bypass line connection.

FIG. 18 is a flowchart showing the process of the bypass line connection control unit 302 at the time of the completion of the bypass line connection of all required B channels.

First, the bypass line connection control unit 302 reports to the channel management unit 303 an ISDN line ID whose connection is completed, an ISDN connection destination number and a connection completion (step 1601 in FIG. 18).

Then, the bypasss line connection control unit 302 reports the connection completion to a bulk transfer control unit 306 (step 1602 in FIG. 18). After this, the bulk transfer control unit 306 starts a bulk transfer.

Then, the bypass line connection control unit 302 reports to a bypass line band management unit 304 a connection node ID reported by the repeater line control unit 301 in step 701 of FIG. 9, the number of B channels whose connection is completed and a connection completion (step 1603 in FIG. 18).

Furthermore, the bypass line connection control unit 302 reports to a call control processor unit 305 the connection node ID reported by the repeater line control unit 301 in step 701 of FIG. 9 and a connection completion (step 1604 in FIG. 18).

The operations of both the bypass line band management unit 304 and the call control processor unit 305 corresponding to each of the reports in steps 1603 and 1604 of FIG. 18 described above, are described later.

Figure 19:
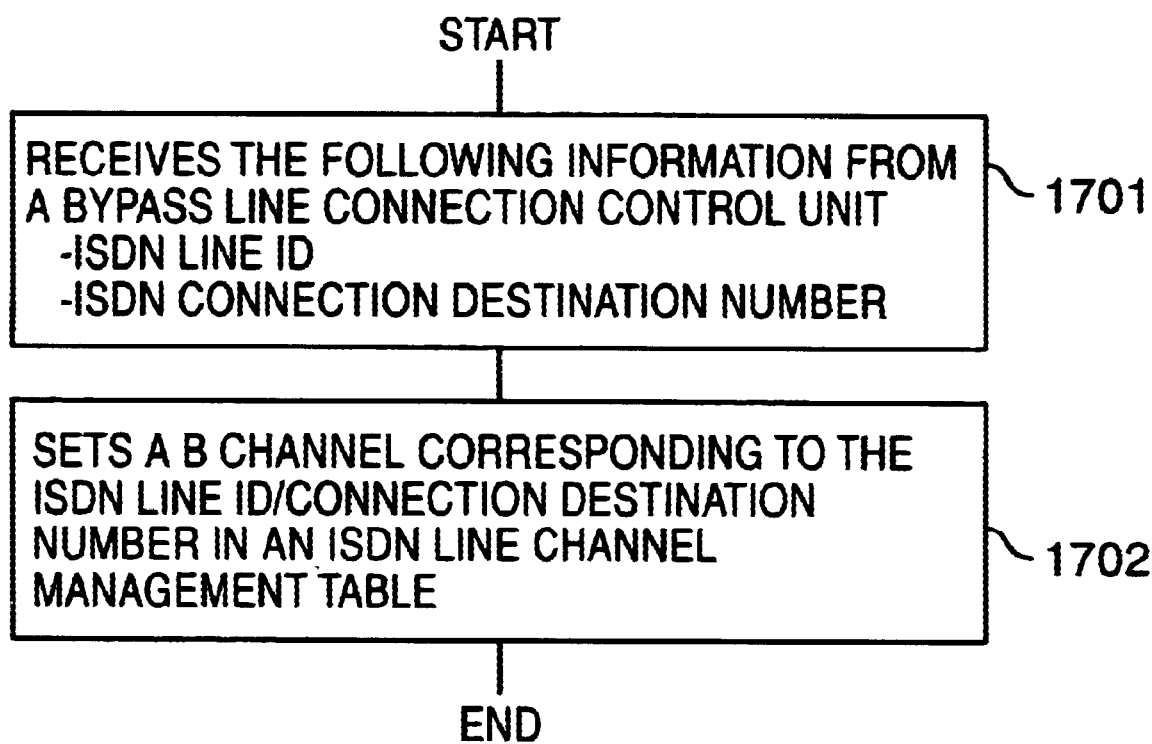
FIG. 19 is a flowchart showing the process of a channel management unit at the time of the completion of a bypass line connection.

When receiving the connection completion notice from the bypass line connection control unit 302 based on the control process of step 1601 in FIG. 18, the channel management unit 303 executes a control process shown by a flowchart in FIG. 19.

First, the channel management unit 303 receives from the bypass line connection control unit 302 both an ISDN line ID whose connection is completed and an ISDN connection destination number (step 1701 in FIG. 19).

Then, the channel management unit 303 resets the status of "reserved" B channel in which the ISDN connection destination number is set, to "used" corresponding to the ISDN line ID in the ISDN line channel management table shown in FIG. 6C (step 1702 in FIG. 19).

Figure 20:
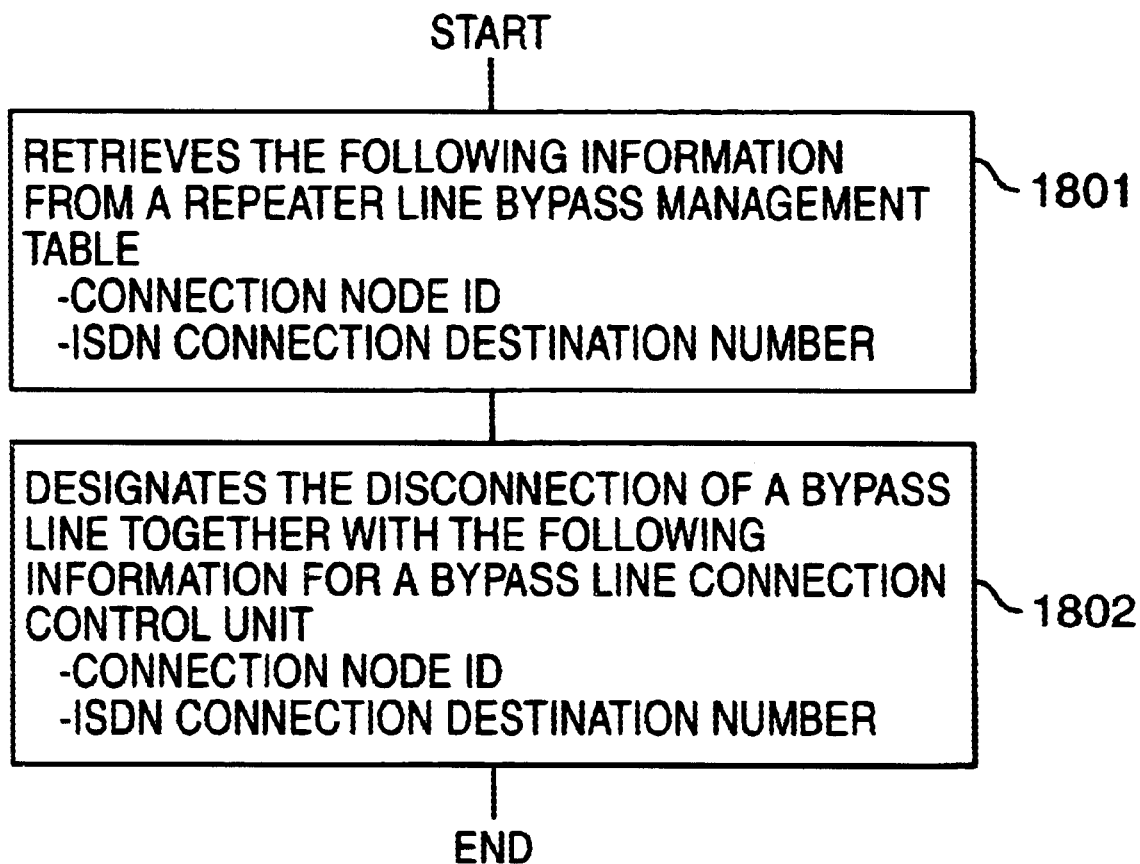
FIG. 20 is a flowchart showing the process of a repeater line control unit at the time of a bypass line disconnection.

If the release cue of a bypass line occurs due to a recovery of a failure, etc., in a repeater line 202, the repeater line control unit 301 in the ATM node 101 executes a control process shown by a flowchart in FIG. 20.

First, the repeater line control unit 301 retrieves from a repeater line bypass destination management table shown in FIG. 6A both a connection node ID and an ISDN connection destination number corresponding to the repeater line ID where a release cue occurs in the repeater line 202 (step 1801 in FIG. 20).

Then, the repeater line control unit 301 reports to the bypass line connection control unit 302 the connection node ID, the ISDN connection destination number and the disconnection of the bypass line (step 1802 in FIG. 20).

Figure 21:
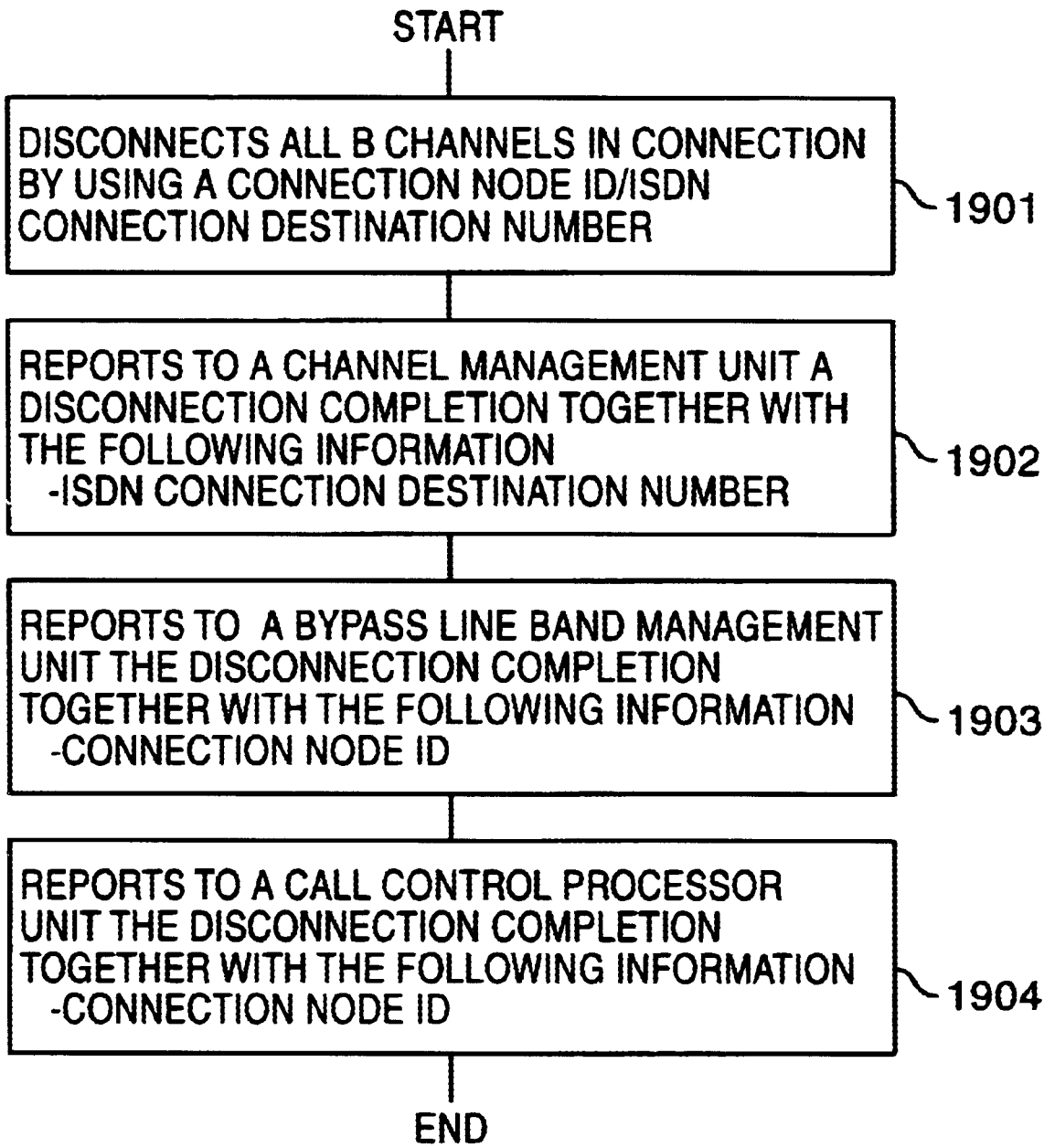
FIG. 21 is a flowchart showing the process of a bypass line connection control unit at the time of a bypass line disconnection.

When receiving the disconnection notice of the bypass line from the repeater line control unit 301, the bypass line connection control unit 302 executes a control process shown by a flowchart in FIG. 21.

First, the bypass line connection control unit 302 disconnects all corresponding B channels in connection based on both the connection node ID and ISDN connection destination number reported by the repeater line control unit 301 (step 1901 in FIG. 21).

Then, the bypass line connection control unit 302 reports the channel management unit 303 the ISDN connection destination number reported by the repeater line control unit 301 and a disconnection completion (step 1902 in FIG. 21).

Then, the bypass line connection control unit 302 reports the bypass line band management unit 304 the connection node ID reported by the repeater line control unit 301 and the disconnection completion (step 1903 in FIG. 21).

In the same way, the bypass line connection control unit 302 reports the call control processor unit 305 the connection node ID reported by the repeater line control unit 301 and the disconnection completion (step 1904 in FIG. 21).

The operations of both the bypass line band management unit 304 and the call control processor unit 305 corresponding to each of notices in steps 1903 and 1904 of FIG. 21 described above, are described later.

Figure 22:
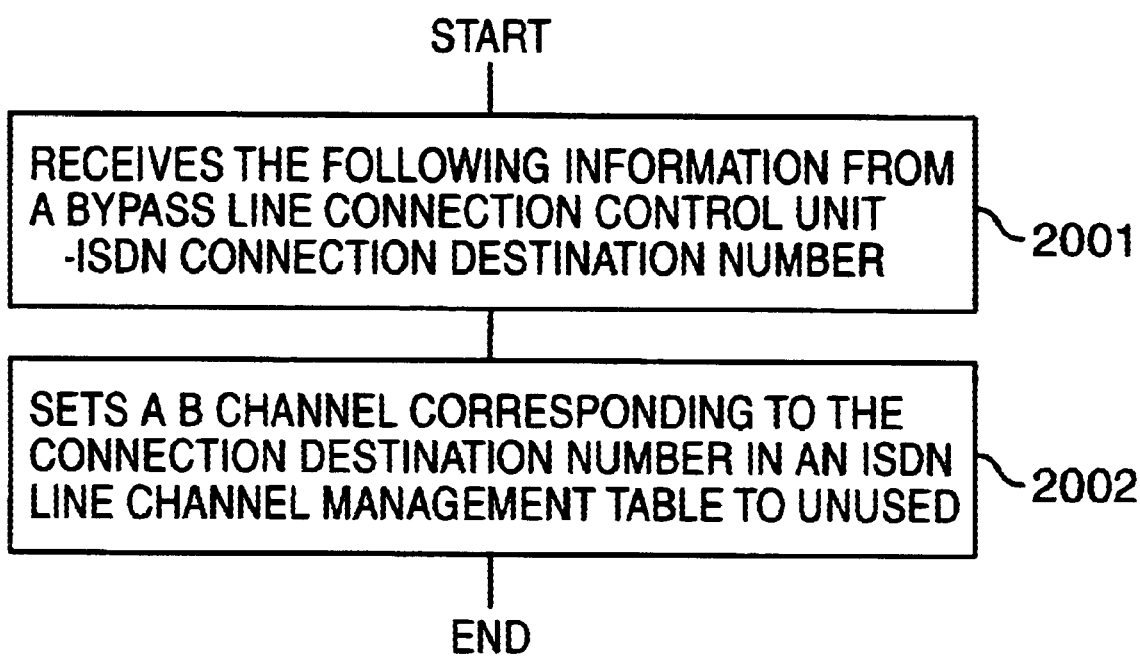
FIG. 22 is a flowchart showing the process of a channel management unit at the time of a bypass line disconnection.

When receiving the disconnection completion notice from the bypass line connection control unit 302 based on the control process of step 1902 in FIG. 21, the channel management unit 303 executes a control process shown by a flowchart in FIG. 22.

First, the channel management unit 303 receives from the bypass line connection control unit 302 an ISDN connection destination number whose disconnection is completed (step 2001 in FIG. 22).

Then, the channel management unit 303 resets the status of a "used" B channel whose ISDN connection destination number is set, to "unused" in the ISDN line channel management table shown in FIG. 6C (step 2002 in FIG. 22).

Next, the control operations of the bypass line band management unit 304, call control processor 305 and operation command processor unit 307 are described.

The bypass line band management unit 304 stores a bypass line band management table with a configuration shown in FIG. 6D. This table manages a connection node ID, a bypass line band (number of B channels), a bypass band restriction ratio, a bypass line band restriction value and a bypass line band occupancy value for each bypass line.

The call control processor unit 305 stores both a terminal bypass management table with a configuration shown in FIG. 6E and a connection destination bypass regulation table with a configuration shown in FIG. 6F. The terminal bypass management table manages a terminal address and bypass available/unavailable information for each terminal 201 (see FIG. 4). The connection destination bypass regulation table manages the connection node ID, bypass line in-connection/out-of-connection and bypass line under-restriction/under-non-restriction information for each connection node.

In the ATM node 101, by executing a control process shown by a flowchart in FIG. 23, the operation command processor unit 307 receives a command of the bypass available/unavailable information from a maintenance console or a remote control device not shown in FIG. 4.

First, the operation command processor unit 307 receives a bypass available/unavailable set command for each terminal 201 (step 2101 in FIG. 23).

Then, the operation command processor unit 307 reports to the call control processor unit 305 both the terminal address and bypass available/unavailable information of a terminal receiving the command (step 2102 in FIG. 23).

Figure 24:
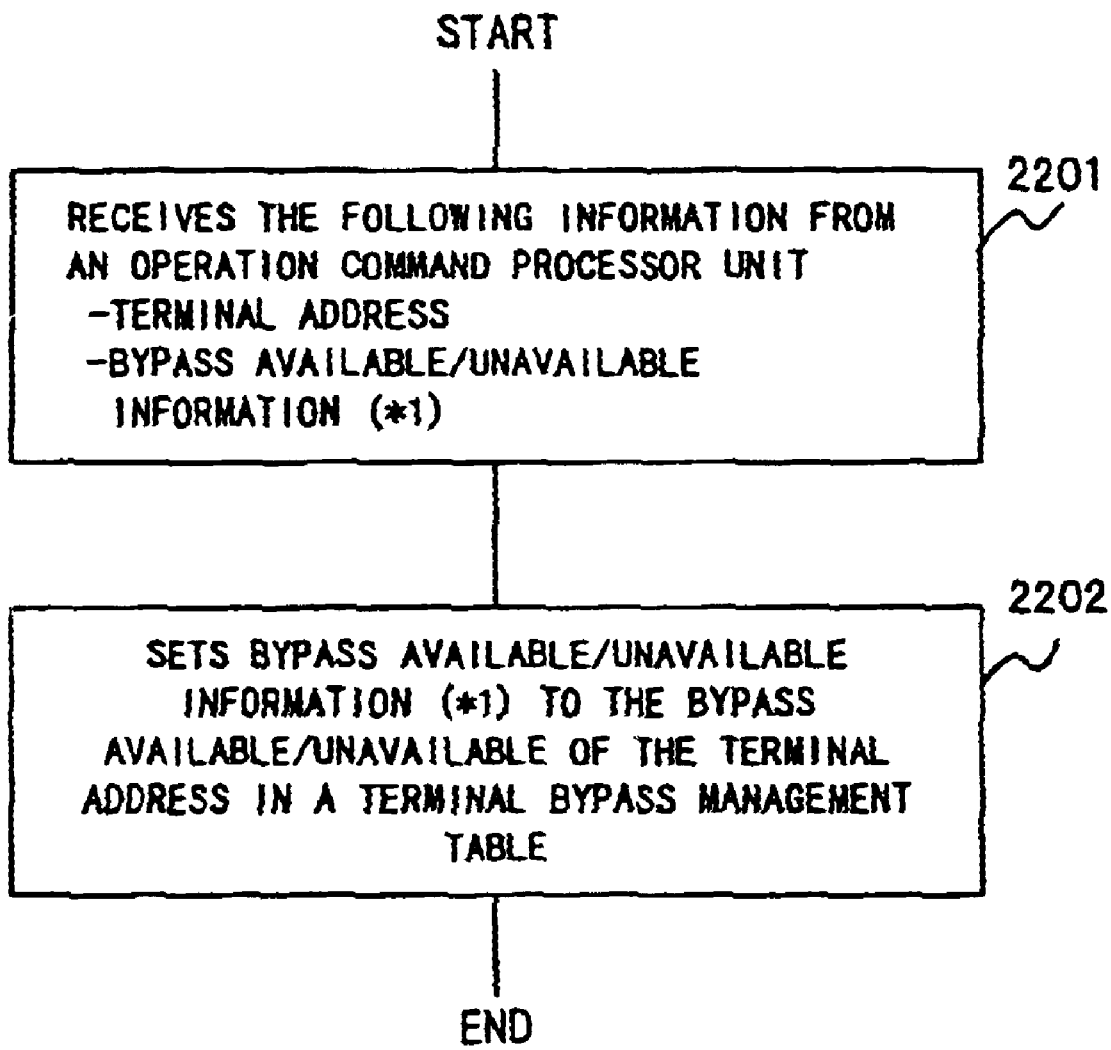
FIG. 24 is a flowchart showing the process of a call control processor unit at the time of the reception of a bypass Yes/No set command.

When receiving both the terminal address and the bypass available/unavailable information, the call control processor unit 305 executes a control process shown by a flowchart in FIG. 24.

First, the call control processor unit 305 receives both the terminal address and the bypass available/unavailable information from the operation command processor unit 307 (step 2201 in FIG. 24).

Then, the call control processor unit 305 sets the bypass available/unavailable information in the terminal bypass management table shown in FIG. 6E corresponding to the terminal address (step 2202 in FIG. 24).

Figure 25:
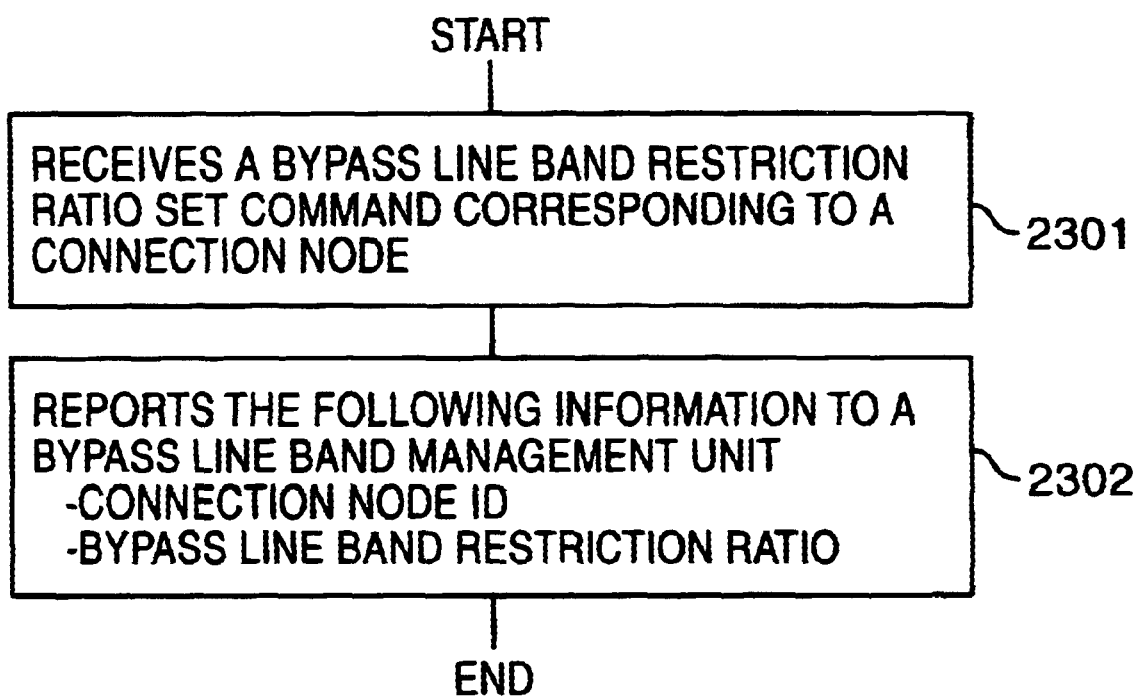
FIG. 25 is a flowchart showing the process of an operation command processor unit at the time of the reception of a bypass line band restriction ratio command.

Then, in the ATM node 101, the operation command processor unit 307 receives a command of a bypass band restriction ratio from a maintenance console or a remote control device not shown in FIG. 4 by executing a control process shown by a flowchart in FIG. 25.

First, the operation command processor unit 307 receives a bypass line band restriction ratio set command for each connection node (step 2301 in FIG. 25).

Then, the operation command processor unit 307 reports the connection node ID and bypass line band restriction ratio information to the bypass line band management unit 304 (step 2302 in FIG. 25).

Figure 26:
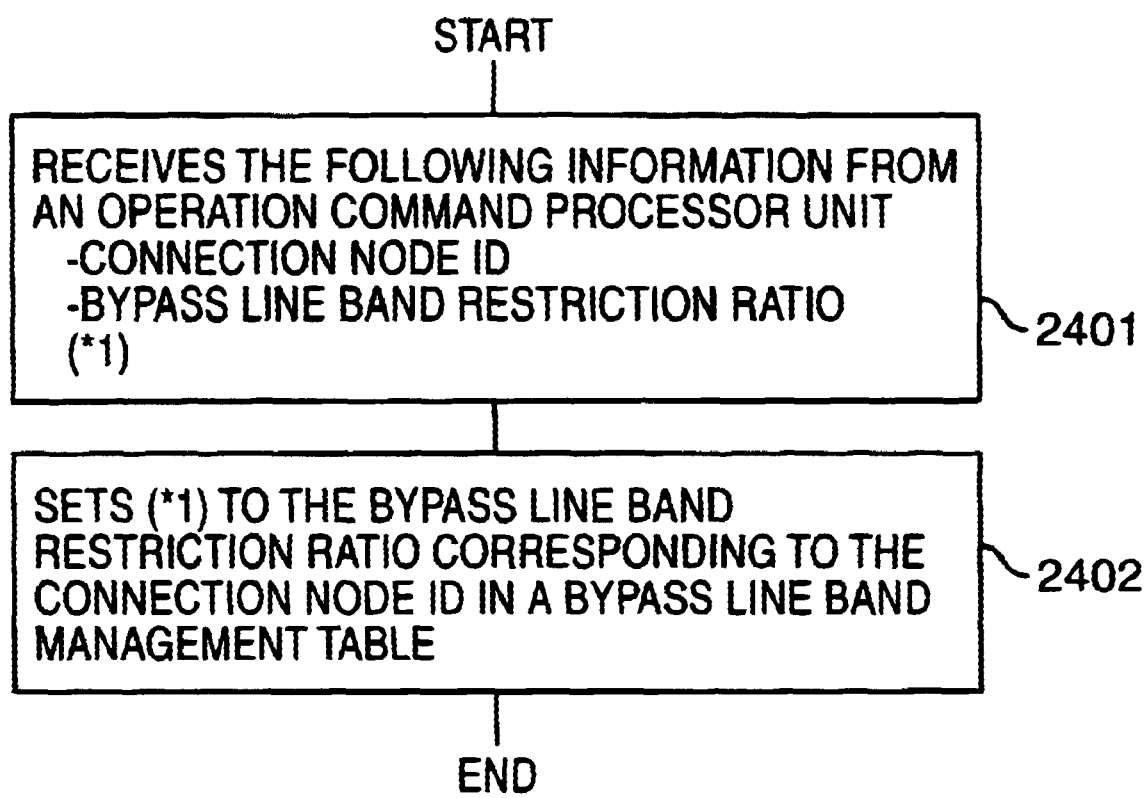
FIG. 26 is a flowchart showing the process of a bypass circuit band management unit at the time of the reception of a bypass line band restriction ratio information.

When receiving both the connection node ID and bypass line band restriction ratio information, the bypass line band management unit 304 executes a control process shown by a flowchart in FIG. 26.

First, the bypass circuit band management unit 304 receives both the connection node ID and bypass line band restriction ratio from the operation command processor unit 307 (step 2401 in FIG. 26).

Then, the bypass line band management unit 304 sets the bypass band restriction ratio in the bypass band management table shown in FIG. 6D corresponding to the connection node ID (step 2402 in FIG. 26).

As described earlier, the bypass line connection control unit 302 reports to the bypass line band management unit 304 the connection node ID whose connection is completed, the number of B channels and a connection completion at the time of the connection completion of all required B channels (See step 1603 in FIG. 18).

Figure 27:
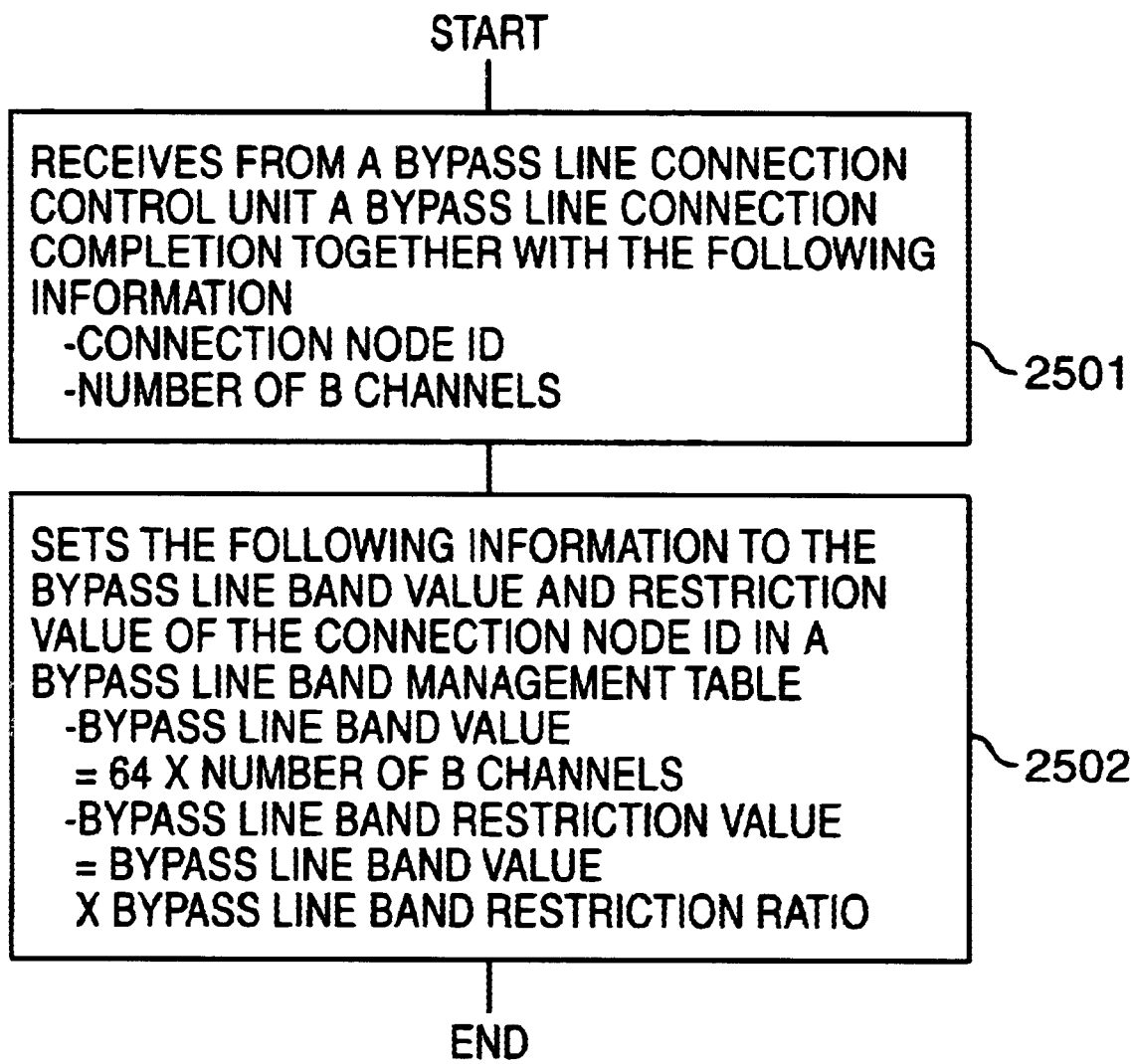
FIG. 27 is a flowchart showing the process of a bypass line band management unit at the time of the completion of a bypass connection.

On the other hand, the bypass line band management unit 304 executes a control process shown by a flowchart in FIG. 27).

First, the bypass line band management unit 304 receives both a connection node ID whose connection is completed and the number of B channels from the bypass line connection control unit 302 (step 2501 in FIG. 27).

Then, the bypass line band management unit 304 calculates and sets a bypass line band value in an entry corresponding to the connection node ID in the bypass circuit band management table shown in FIG. 6D as {64 bps (bit/second) x number of B channels}, and calculates and sets a bypass line band restriction value as {bypass line band value x bypass line band restriction ratio} (step 2502 in FIG. 27).

As described earlier, the bypass line connection control unit 302 reports to the call control processor unit 305 a connection node ID whose connection is completed and the connection completion at the time of the connection completion of all required B channels (See step 1604 in FIG. 18).

Figure 28:
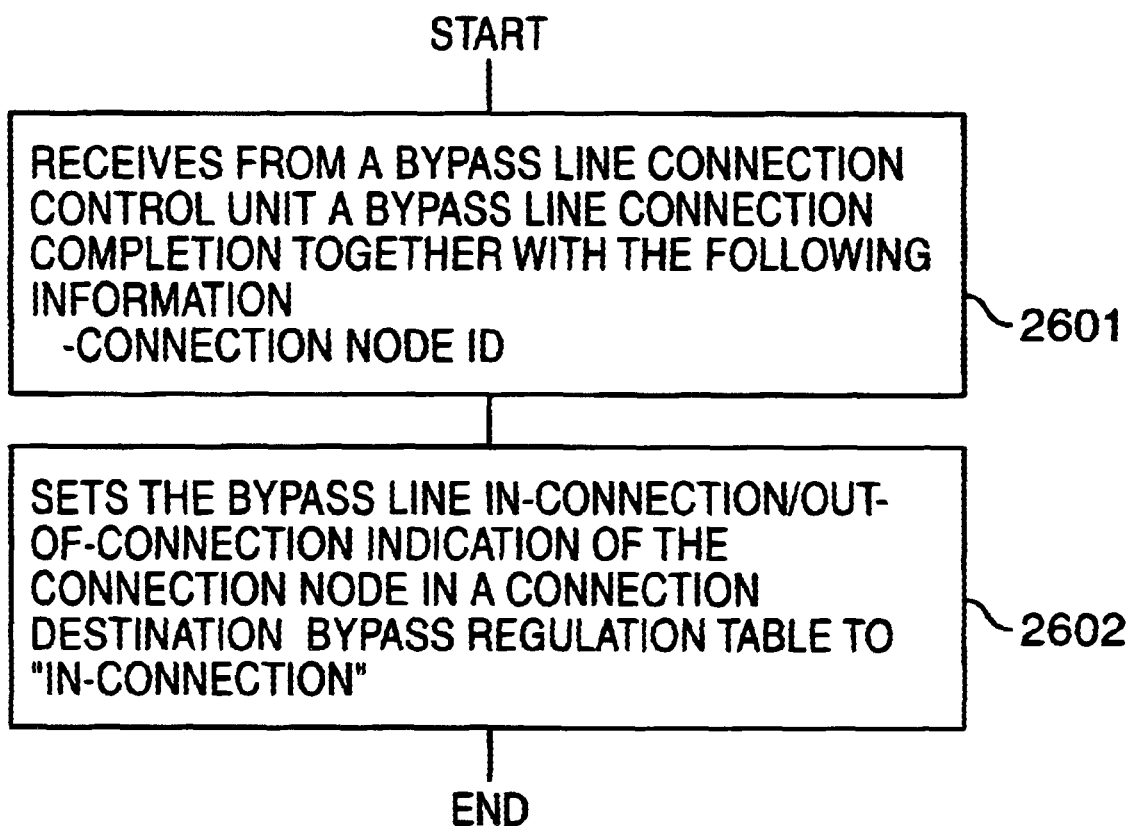
FIG. 28 is a flowchart showing the process of a call control processor unit at the time of the completion of a bypass line connection.

On the other hand, the call control processor unit 305 executes a control process shown by a flowchart in FIG. 28.

First, the call control processor unit 305 receives a connection node ID whose connection is completed from the bypass line connection control unit 302 (step 2601 in FIG. 28).

Then, the call control processor unit 305 sets a bypass line in-connection/out-of-connection indication to "in-connection" in an entry corresponding to the connection node ID in the connection destination bypass regulation table shown in FIG. 6F (step 2602 in FIG. 28).

Figure 29:
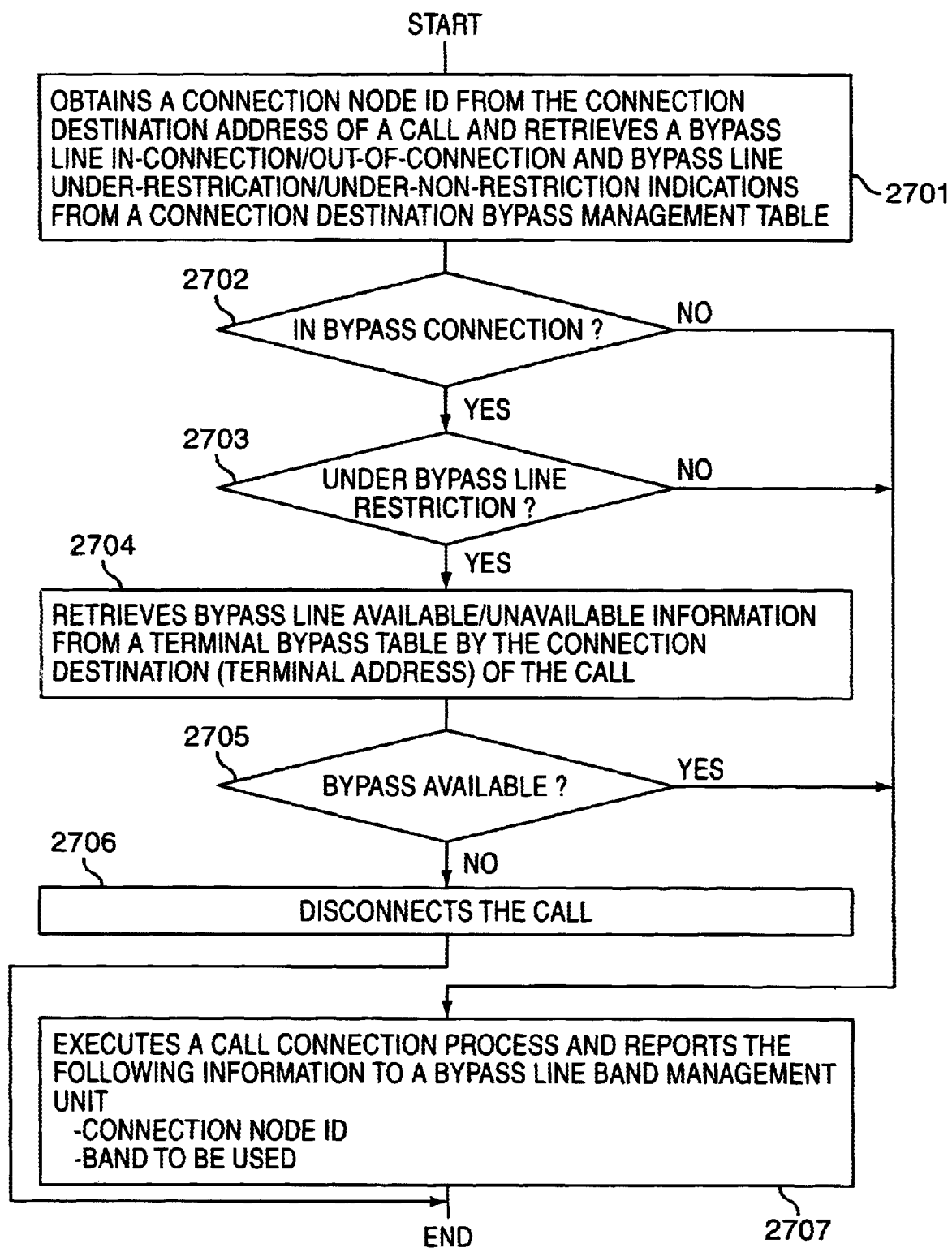
FIG. 29 is a flowchart showing the process of a call control processor unit at the time of a call generation.

When a call is originated, by obtaining a connection node ID corresponding to the ATM node 101 of a connection destination from the terminal address of the connection destination of the call and retrieving the bypass line in-connection/out-of-connection information and bypass circuit under restriction/under non-restriction information of an entry corresponding to the connection node ID in the connection destination bypass regulation table shown in FIG. 6F (step 2701 in FIG. 29), the call control processor unit 305 judges whether or not a bypass line corresponding to the connection node ID is in connection (step 2702 in FIG. 29) and whether or not the bypass line is under restriction (step 2703 in FIG. 29).

Furthermore, if the bypass line is under restriction, the call control processor unit 305 retrieves and judges bypass available/unavailable information from the terminal address of the connection destination of the call in the terminal bypass management table (steps 2704 and 2705 in FIG. 29).

If the bypass line corresponding to the connection node ID is in connection (when the judgement of step 2702 in FIG. 29 is Yes), the bypass line is under restriction (when the judgement of step 2703 in FIG. 29 is Yes) and the bypass of the terminal 201 being the connection destination of the call is unavailable (when the judgement of step 2705 in FIG. 29 is No), the call control processor unit 305 refuses to set up (disconnects) a call to the terminal 201 being the connection destination (step 2706 in FIG. 29).

If the bypass corresponding to the connection node ID is out of connection (when the judgement of step 2702 in FIG. 29 is No), the bypass line is under non-restriction (when the judgement of step 2703 in FIG. 29 is No), or the bypass line is under restriction and the bypass of the terminal 201 is the connection source of the call, the call control processor unit 305 executes a call connection process for the terminal 201 being the connection destination. Then, the call control processor 305 reports to the bypass line band management unit 304 both the connection node ID of the ATM node 101 being the connection destination of the call and a band to be used by the call (step 2707 in FIG. 29).

Figure 30:
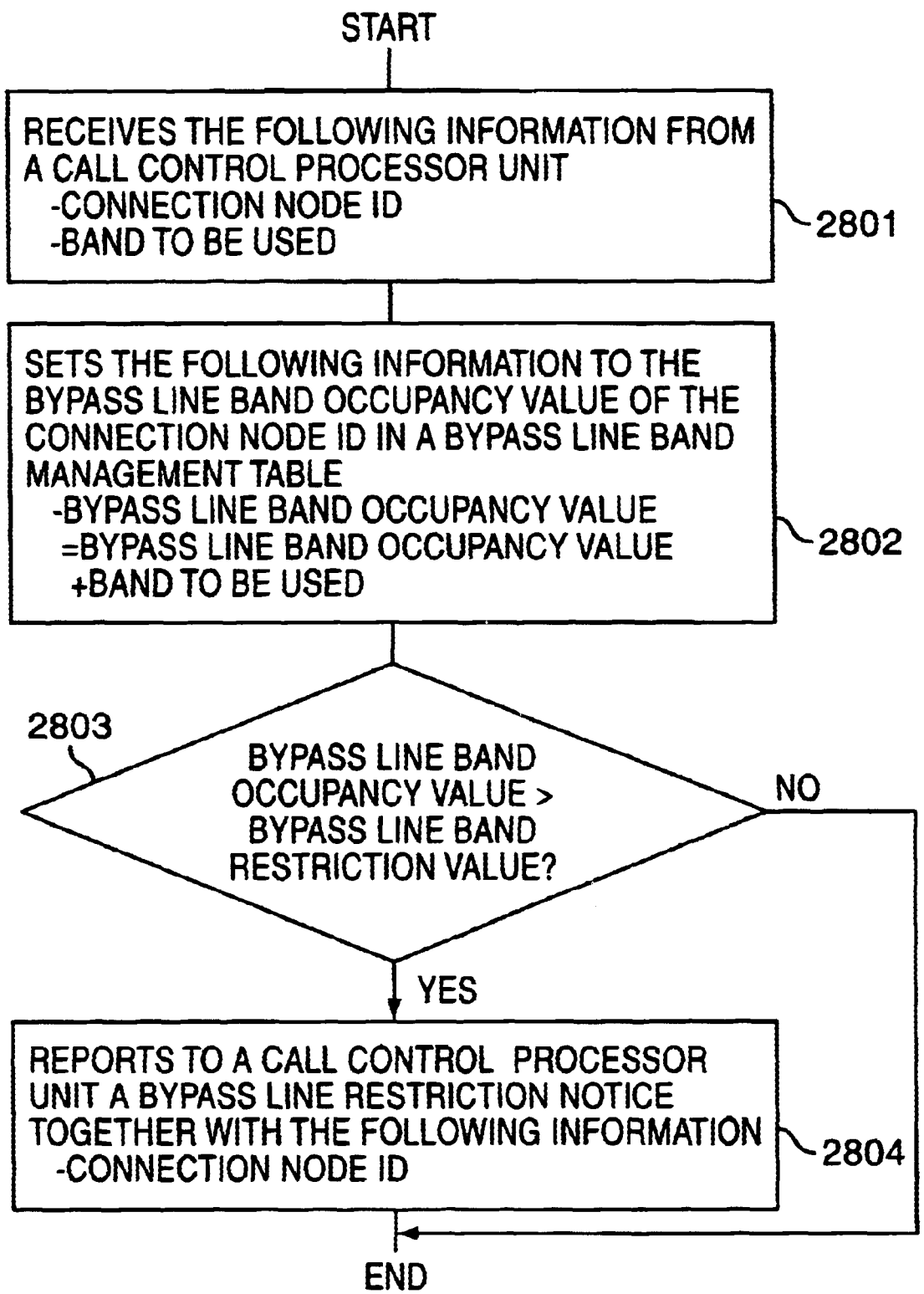
FIG. 30 is a flowchart showing the process of a bypass line band management unit at the time of a call connection.

On the other hand, the bypass line band management unit 304 executes a control process shown by a flowchart in FIG. 30.

First, the bypass line band management unit 304 receives from the call control processor unit 305 both the connection node ID of the ATM node 101 being the connection destination of the call and the band to be used (steps 2801 in FIG. 30).

Then, the bypass circuit band management unit 304 adds the band to be used to a bypass circuit band occupancy value corresponding to the connection node ID in the bypass circuit band management table shown in FIG. 6D (step 2802 in FIG. 30).

Then, the bypass circuit band management unit 304 judges whether or not the bypass circuit band occupancy value corresponding to the connection node ID is greater than the bypass circuit band restriction value corresponding to the connection node ID in the bypass circuit band management table shown in FIG. 6D (step 2803 in FIG. 30).

Then, if the judgement is No, the bypass circuit band management unit 304 terminates the process as it is, while if the judgement is Yes, the bypass circuit band management unit 304 reports to the call control processor unit 305 the connection node ID and a bypass circuit restriction notice (step 2804 in FIG. 30).

Figure 31:
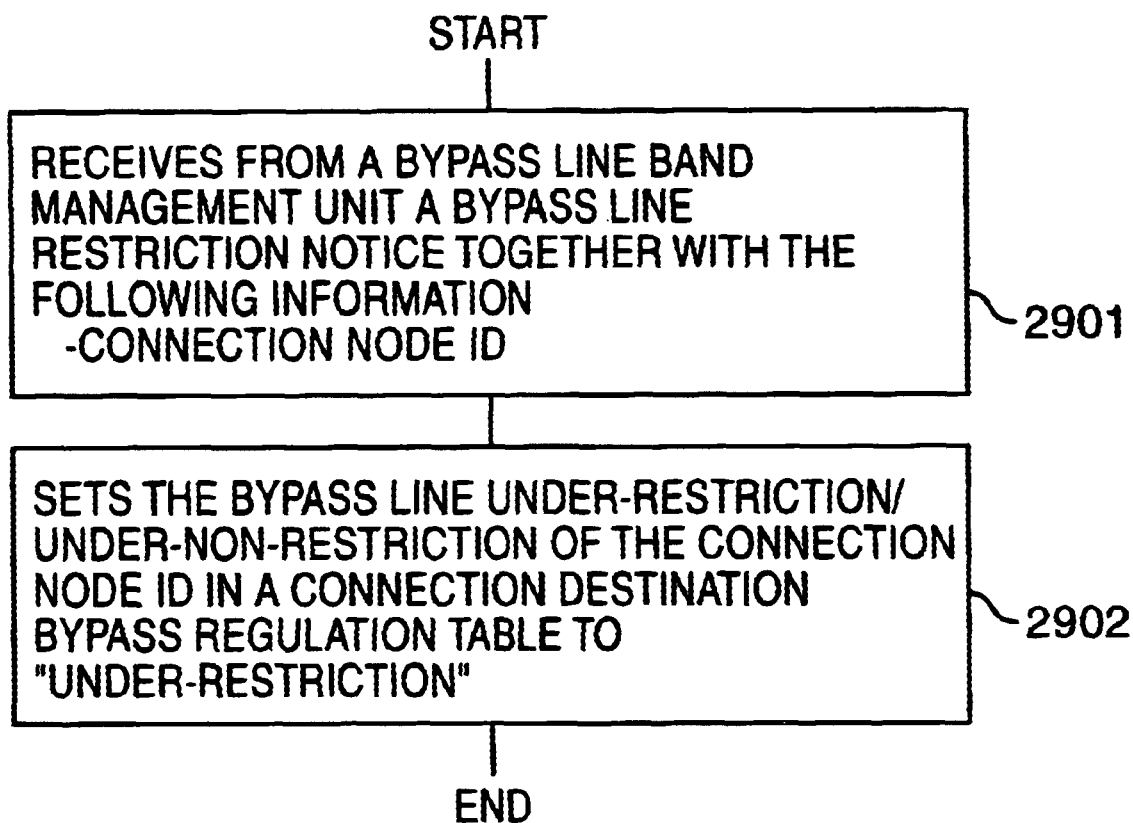
FIG. 31 is a flowchart showing the process of a call control processor unit at the time of the notification of a bypass line restriction.

When receiving this notice, the call control processor unit 305 executes a control process shown by a flowchart in FIG. 31.

First, the call control processor unit 305 receives a bypass line restriction notice and the connection node ID from the bypass line band management unit 304 (step 2901 in FIG. 31).

Then, the call control processor unit 305 sets a bypass line under-restriction/under-non-restriction indication to "under-restriction" in the connection destination bypass regulation table shown in FIG. 6F (step 2902 in FIG. 31).

Figure 32:
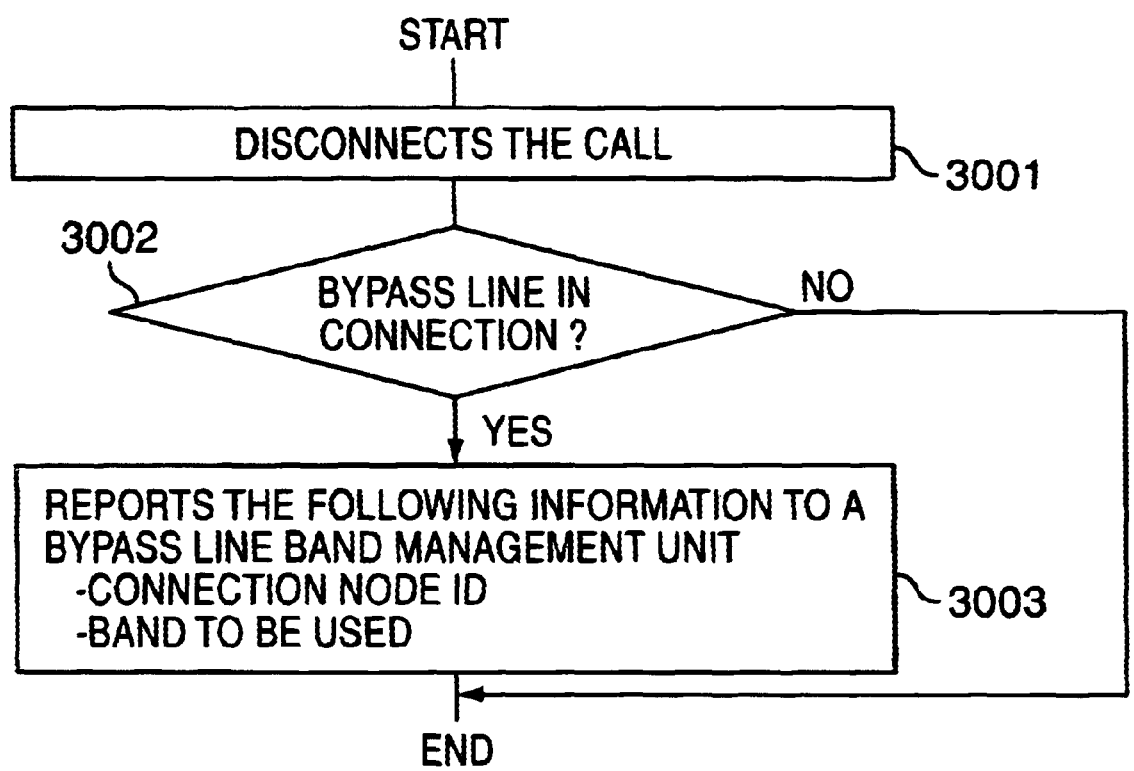
FIG. 32 is a flowchart showing the process of a call control processor unit at the time of a call disconnection.

If a call is disconnected by a call disconnection notice from a terminal 201, etc., the call control processor unit 305 executes a control process shown by a flowchart in FIG. 32.

First, the call control processor unit 305 disconnects a corresponding call (step 3001 in FIG. 32).

Then, the call control processor unit 305 judges whether or not a bypass line in-connection/out-of-connection indication corresponding to the connection node ID of an ATM node 101 being a connection destination corresponding to the disconnected call indicates "in-connection" in the connection destination bypass regulation table shown in FIG. 6F (step 3002 in FIG. 32).

If the bypass line in-connection/out-of-connection indication indicates "out-of-connection", the call control processor unit 305 terminates the process as it is, while if the bypass in-connection/out-of-connection indication indicates "in-connection", the call control processor unit 305 reports to the bypass band management unit 304 both the connection node ID and a band to be used by the call (step 3003 in FIG. 32).

Figure 33:
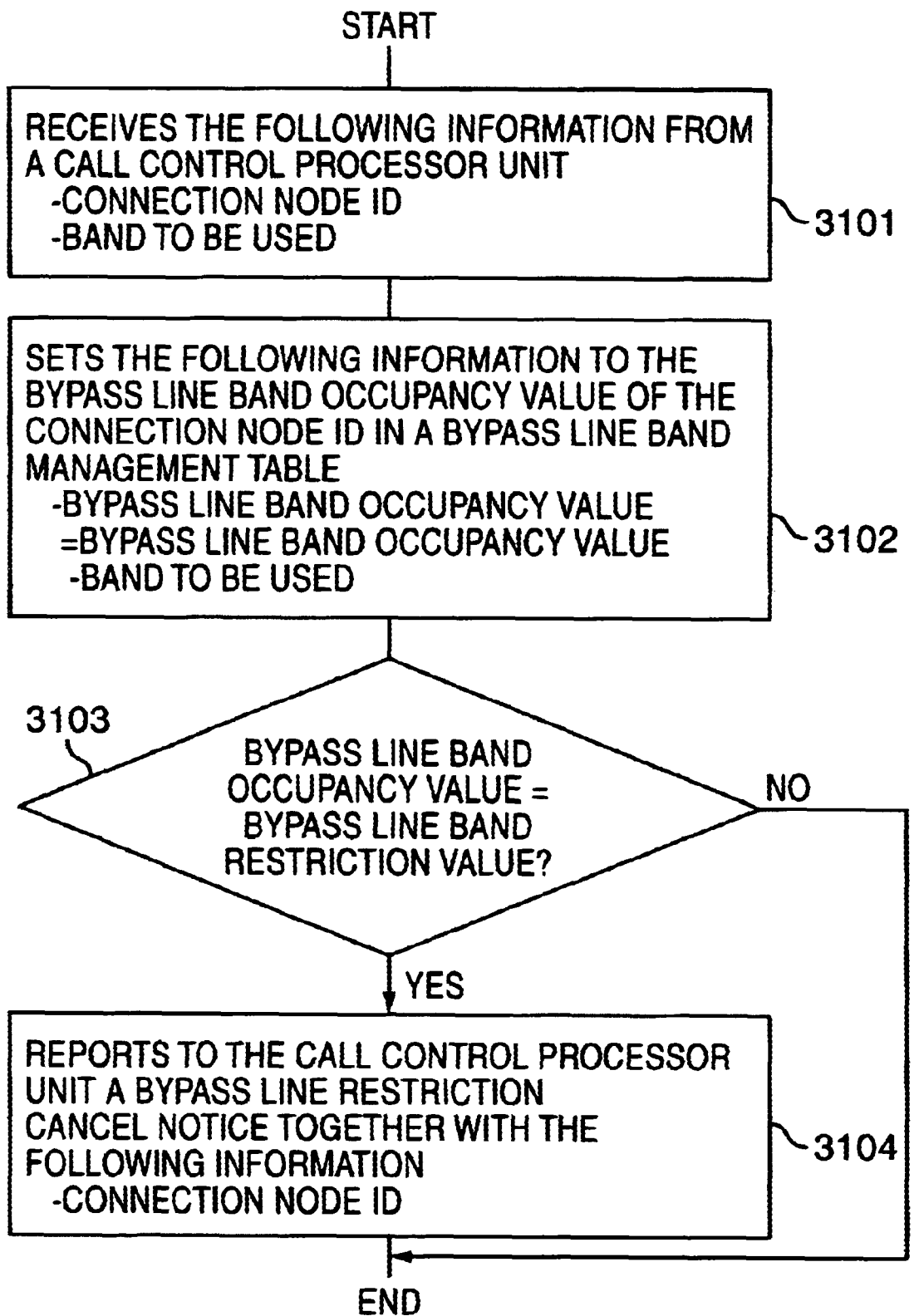
FIG. 33 is a flowchart showing the process of a bypass line band management unit at the time of a call disconnection.

When receiving this notice, the bypass band management unit 304 executes a control process shown by a flowchart in FIG. 33.

First, the bypass band management unit 304 receives from the call control processor unit 305 both the connection node ID and the band to be used by the call (step 3101 in FIG. 33).

Then, the bypass line band management unit 304 subtracts the band to be used by the call from a bypass line band occupancy value corresponding to the connection node ID in the bypass line band management table shown in FIG. 6D (step 3102 in FIG. 33).

After that, the bypass line band management unit 304 judges whether or not the bypass line band occupancy value corresponding to the connection node ID is less than a bypass line band restriction value corresponding to the connection node ID in the bypass band management table shown in FIG. 6D (step 3103 in FIG. 33).

If the judgement is No, the bypass line band management unit 304 terminates the process as it is, while if the judgement is Yes, the bypass line band management unit 304 reports both the connection node ID and a bypass line restriction cancel notice to the call control processor unit 305 (step 3104 in FIG. 33).

Figure 34:
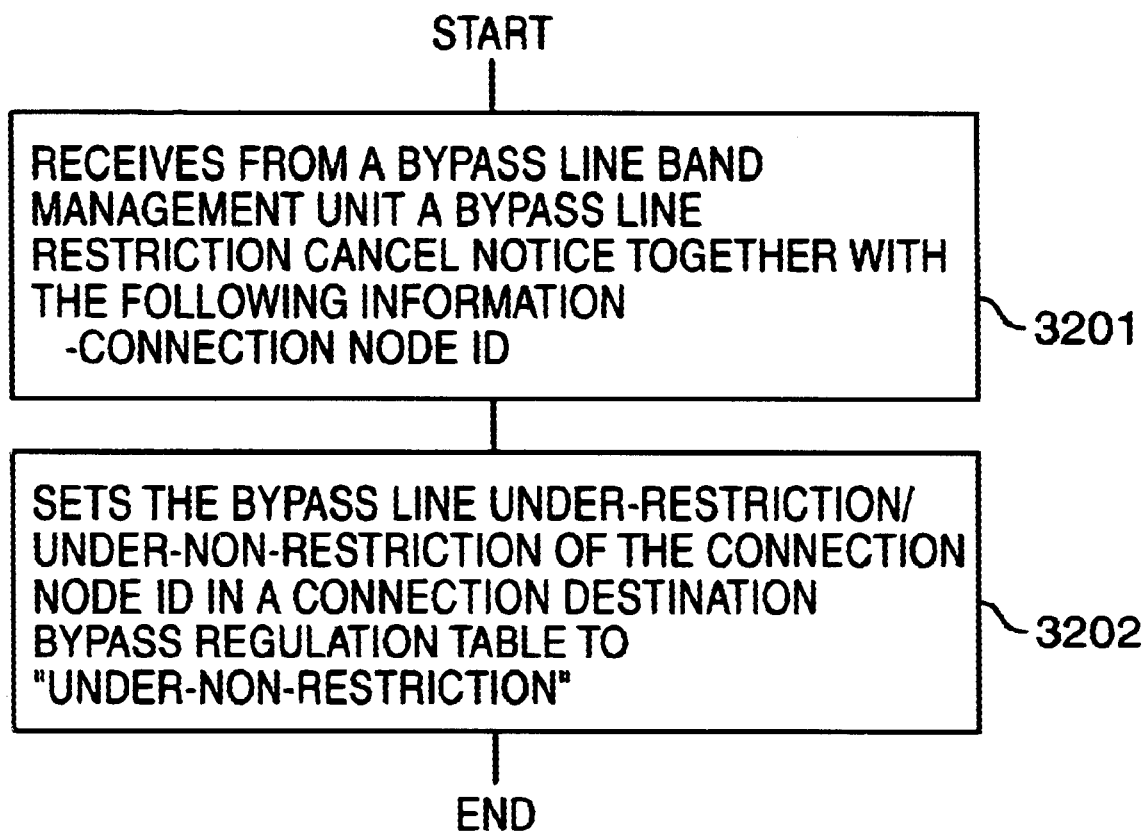
FIG. 34 is a flowchart showing the process of a call control processor unit at the time of the notification of a bypass line restriction cancel.

When receiving this notice, the call control processor unit 305 executes a control process shown by a flowchart in FIG. 34.

First, the call control processor unit 305 receives the bypass line restriction cancel notice and the connection node ID from the bypass line band management unit 304 (step 3201 in FIG. 34).

Then, the call control processor unit 305 sets a bypass line under-restriction/under-non-restriction indication corresponding to the connection node ID to "under-non-restriction" in the connection destination bypass regulation table shown in FIG. 6F (step 3202 in FIG. 34).

As described earlier, when receiving a bypass disconnection notice from the repeater line control unit 301, the bypass line connection control unit 302 reports to the call control processor unit 305 both the connection node ID reported by the repeater line control unit 301 and a disconnection completion (bypass line release) (See step 1904 in FIG. 21).

Figure 35:
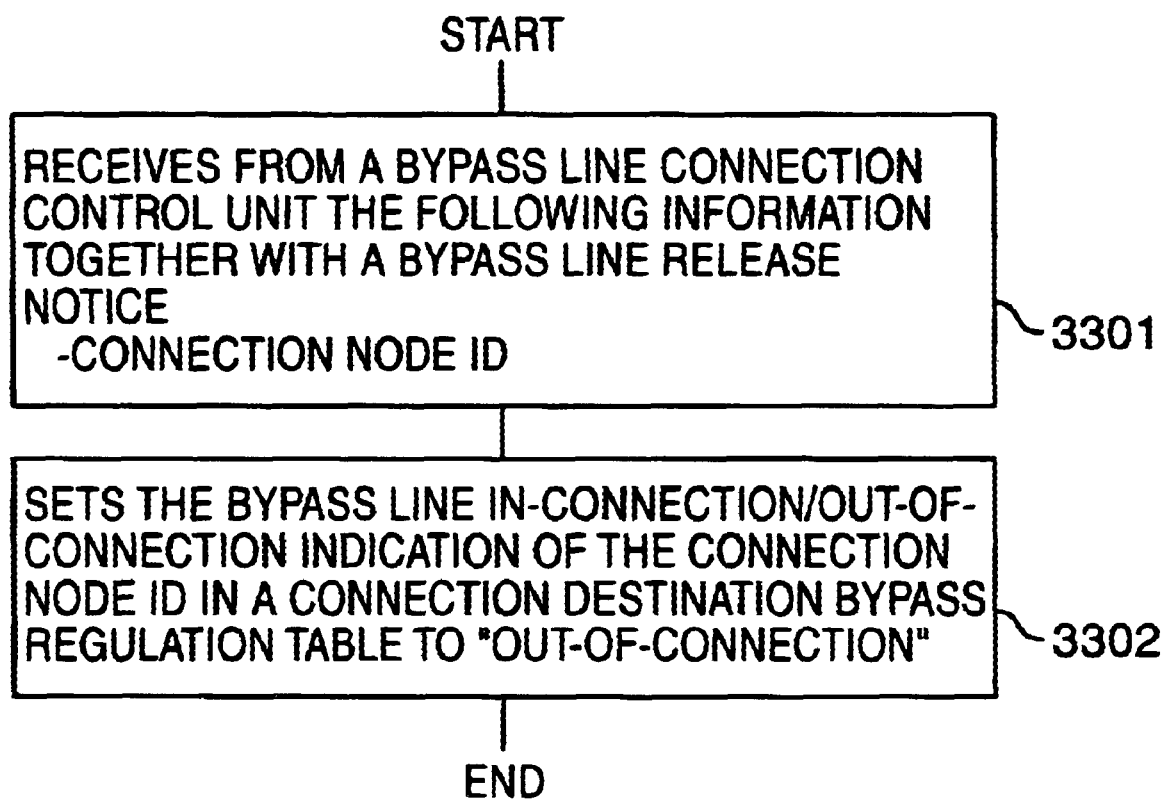
FIG. 35 is a flowchart showing the process of a call control processor unit at the time of the release of a bypass line.

When receiving this notice, the call control processor unit 305 executes a control process shown by a flowchart in FIG. 35.

First, the call control processor unit 305 receives the bypass line release notice and the connection node ID from the bypass line connection control unit 302 (step 3301 in FIG. 35).

Then, the call control processor unit 305 sets a bypass line in-connection/out-of-connection indication corresponding to the connection node ID to "out-of-connection" in the connection destination bypass regulation table shown in FIG. 6F (step 3302 in FIG. 35).

As described earlier, when receiving the bypass disconnection notice from the repeater line control unit 301, the bypass line connection control unit 302 reports to the bypass line band management unit 304 both the connection node ID reported by the repeater line control unit 301 and a disconnection completion (bypass line release) (See step 1903 in FIG. 21).

Figure 36:
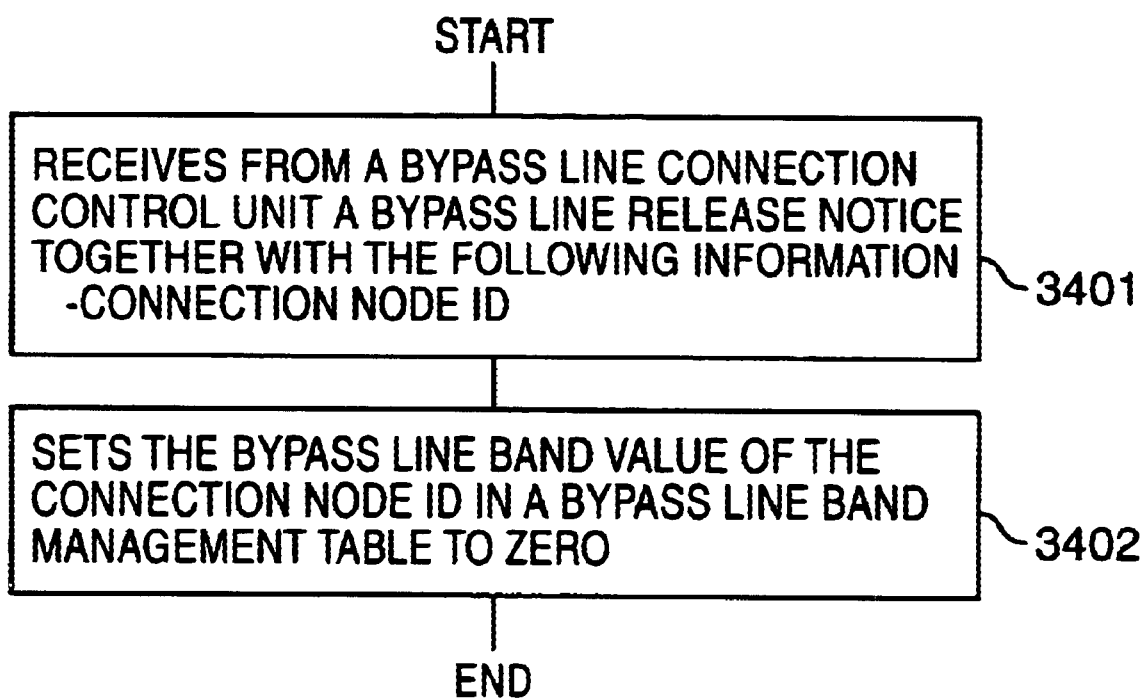
FIG. 36 is a flowchart showing the process of a bypass line band management unit at the time of the release of a bypass line.

When receiving this notice, the bypass line band management unit 304 executes a control process shown by a flowchart in FIG. 36.

First, the bypass line band management unit 304 receives the bypass line disconnection notice and the connection node ID from the bypass line connection control unit 302 (step 3401 in FIG. 36).

Then, the bypass line b and management unit 304 sets a bypass band occupancy value corresponding to the connection node ID to zero in the bypass line band management table shown in FIG. 6D (step 3402 in FIG. 36).

What is claimed is:

1. An ISDN line selecting method of securing a backup line of a repeater line between connection nodes by connecting the connection nodes using an ISDN line being an integrated services digital network in which a bulk transfer of a plurality of B channels is performed to secure a required bandwidth, the bulk transfer by a pilot selection function where a setup message includes the pilot number of a destination apparatus and a number of B channels to be secured, comprising:

selecting an ISDN line for backup in which a bulk transfer of a plurality of B channels is to be performed, out of a plurality of ISDN lines installed between connection node apparatuses by a the pilot selection function on an ISDN switching network side where the ISDN lines are switched; and selecting the ISDN line for backup, in which the bulk transfer of the plurality of B channels is performed, by exchanging a line number of the ISDN line to be selected, between the connection node apparatuses as user-user information in a D channel message of the ISDN line when the ISDN line is selected out of the plurality of ISDN lines installed between the connection node apparatuses.

2. The method according to claim 1, further comprising:
selecting an ISDN line for backup in which a bulk transfer of the plurality of B channels is performed by exchanging a number of B channels in which the bulk transfer is performed between the connection node apparatuses as user-user information in a D channel message of the ISDN line when the ISDN line is selected.

3. The method according to claim 1, further comprising:
reserving and securing a selected ISDN line for a certain period when selecting the ISDN line.

4. The method according to claim 1, further comprising:
relaying communications based on an asynchronous transfer mode communicating method in the repeater line.

5. A call controlling method of controlling calls from terminals connected to connection node apparatuses when a backup line of a repeater line is secured between the connection node apparatuses, by connecting the connection node apparatuses using an ISDN line being an integrated services digital network in which a bulk transfer of a plurality of B channels is performed to secure a required bandwidth, the bulk transfer by a pilot selection function where a setup message includes the pilot number of a destination apparatus and a number of B channels to be secured, comprising:

managing a bandwidth of the ISDN line;
managing a priority of each of the terminals; and
controlling calls from each of the terminals based on both the bandwidth of the ISDN line and the priority of each of the terminals.

6. The method according to claim 5, further comprising:
comparing a required bandwidth of a call from each of the terminals with the bandwidth of the ISDN line, setting the call from each of the terminals regardless of the priority of each of the terminals if the required bandwidth is narrower than the bandwidth of the ISDN line, and determining whether or not to connect the call from each of the terminals based on the priority of each of the terminals if the required bandwidth is wider than the bandwidth of the ISDN line.

7. A connection node apparatus for controlling the securing of a backup line of a repeater line between connection node apparatuses by connecting the connection nodes using an ISDN line being an integrated services digital network in which a bulk transfer of a plurality of B channels is performed to secure a required bandwidth, the bulk transfer by a pilot selection function where a setup message includes the pilot number of a destination apparatus and a number of B channels to be secured, comprising:

line number exchanging unit selecting an ISDN line for backup in which the bulk transfer of a plurality of B channels is performed, out of a plurality of ISDN lines installed between said connection node apparatuses by way of the pilot selection function on an ISDN switching network side where the ISDN lines are switched, and simultaneously exchanging a line number of an ISDN line to be selected, as user-user information in a D channel message of the ISDN line between the connection node apparatuses when the ISDN line is selected; and line selecting unit selecting an ISDN line for backup in which a bulk transfer of the plurality of B channels is performed, based on the exchanged line number.

8. The apparatus according to claim 7, further comprising:
B channel number exchanging unit exchanging a number of B channels in which the bulk transfer is performed, between the connection node apparatuses as user-user information in a D channel message of the ISDN line, wherein said line selecting unit selects an ISDN line for backup in which the bulk transfer of a plurality of B channels is performed, based on both the line number and the number of B channels to be exchanged.

9. The apparatus according to claim 7, wherein said line selecting unit reserves and secures the selected ISDN line for a certain period when the ISDN line is selected.

10. The apparatus according to claim 7, wherein the repeater line relays communications based on an asynchronous transfer mode communicating method.

11. A connection node apparatus for controlling calls from terminals connected to connection node apparatuses when a backup line of a repeater line is secured between the connection node apparatuses, by connecting the connection node apparatuses using an ISDN line being an integrated services digital network in which a bulk transfer of a plurality of B channels is performed to secure a required bandwidth, the bulk transfer by a pilot selection function where a setup message includes the pilot number of a destination connection node apparatus and a number of B channels to be secured, comprising:

bandwidth managing unit managing a bandwidth of the ISDN line;
terminal priority managing unit managing a priority of each of the terminals; and
call controlling unit controlling calls from each of the terminals based on both the bandwidth of the ISDN line and the priority of each of the terminals.

12. The apparatus according to claim 11, wherein said call controlling unit compares a required bandwidth of a call from each of the terminals with the bandwidth of the ISDN line managed by the bandwidth managing unit, sets the call from each of the terminals regardless of the priority of each of the terminals if the required bandwidth is narrower than the bandwidth of the ISDN line, and determines whether or not to connect the call from each of the terminals based on the priority of each of the terminals if the required bandwidth is wider than the bandwidth of the ISDN line.

13. A connection node apparatus for controlling the securing of a backup line of a repeater line between connection node apparatuses by connecting the connection nodes using an ISDN line being an integrated services digital network in which a bulk transfer of a plurality of B channels is performed to secure a required bandwidth, the bulk transfer by a pilot selection function where a setup message includes the pilot number of a destination connection node apparatuses and a number of B channels to be secured, comprising:

line number exchanging means for selecting an ISDN line for backup in which the bulk transfer of a plurality of B channels is performed, out of a plurality of ISDN lines installed between said connection node apparatuses by way of a the pilot selection function on an ISDN switching network side where the ISDN lines are switched, and simultaneously exchanging a line number of an ISDN line to be selected, as user-user information in a D channel message of the ISDN line between the connection node apparatuses when the ISDN line is selected; and line selecting means for selecting an ISDN line for backup in which a bulk transfer of the plurality of B channels is performed, based on the exchanged line number.

14. A connection node apparatus for controlling calls from terminals connected to connection node apparatuses when a backup line of a repeater line is secured between the connection node apparatuses, by connecting the connection node apparatuses using an ISDN line being an integrated services digital network in which a bulk transfer of a plurality of B channels is performed to secure a required bandwidth, the bulk transfer by a pilot selection function where a setup message includes the pilot number of a destination connection node apparatus and a number of B channels to be secured, comprising:

bandwidth managing means for managing a bandwidth of the ISDN line;

terminal priority managing means for managing a priority of each of the terminals; and call controlling means for controlling calls from each of the terminals based on both the bandwidth of the ISDN line and the priority of each of the terminals.

* * * * *